United States Patent
Tanaka et al.

(10) Patent No.: US 12,517,189 B2
(45) Date of Patent: Jan. 6, 2026

(54) MAGNETIC SENSOR

(71) Applicant: Asahi Kasei Microdevices Corporation, Tokyo (JP)

(72) Inventors: Ken Tanaka, Tokyo (JP); Kenji Kai, Tokyo (JP); Masaki Yuzawa, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 124 days.

(21) Appl. No.: 18/423,290

(22) Filed: Jan. 25, 2024

(65) Prior Publication Data

US 2024/0255589 A1    Aug. 1, 2024

(30) Foreign Application Priority Data

Jan. 27, 2023 (JP) ................. 2023-011395
Dec. 21, 2023 (JP) ................. 2023-215463

(51) Int. Cl.
 *G01R 33/00* (2006.01)
 *G01R 33/07* (2006.01)

(52) U.S. Cl.
 CPC ......... *G01R 33/0047* (2013.01); *G01R 33/07* (2013.01); *G01R 33/0005* (2013.01)

(58) Field of Classification Search
 CPC ........................ G01R 33/0047; G01R 33/07; G01R 33/0005; G01R 33/06
 See application file for complete search history.

(56) References Cited

U.S. PATENT DOCUMENTS

| | | | |
|---|---|---|---|
| 8,629,539 B2 | 1/2014 | Milano | |
| 9,733,280 B2 | 8/2017 | Hegedus | |
| 9,812,588 B2 | 11/2017 | Vig | |
| 11,226,382 B2 | 1/2022 | Augendre | |
| 11,519,946 B1 | 12/2022 | Rock | |
| 2006/0219436 A1 | 10/2006 | Taylor | |
| 2011/0133732 A1 | 6/2011 | Sauber | |
| 2014/0167736 A1* | 6/2014 | Suzuki | H01L 24/37 324/117 R |
| 2014/0253103 A1 | 9/2014 | Racz | |
| 2016/0187388 A1* | 6/2016 | Suzuki | G01R 15/207 324/244 |
| 2016/0223594 A1* | 8/2016 | Suzuki | G01R 15/20 |
| 2018/0156845 A1* | 6/2018 | Suzuki | G01R 15/202 |
| 2018/0158765 A1 | 6/2018 | Montero | |
| 2019/0346515 A1 | 11/2019 | Motz | |
| 2021/0270915 A1* | 9/2021 | Uemura | G01R 33/0047 |

\* cited by examiner

*Primary Examiner* — Alvaro E Fortich

(57) ABSTRACT

A magnetic sensor comprises a die pad, a first and second magnetoelectric conversion units, and a signal processing unit which processes signals output from the first and second magnetoelectric conversion unit. The die pad includes a first frame portion including a fifth and sixth frame portions, a second frame portion including a seventh and eighth frame portions, a third frame portion, a fourth frame portion, and a coupling portion. At least one of the third, fifth, or seventh frame portions has a first gap which reaches to a first space portion surrounded by the coupling portion, and the third, fifth, and seventh frame portions from an outer edge, and at least one of the fourth, sixth, or eighth frame portions has a second gap which reaches to a second space portion surrounded by the coupling portion, and the fourth, sixth, and eighth frame portions from an outer edge.

28 Claims, 29 Drawing Sheets

100

100A

100B

100C

100D

100E

100F

100G

100H

MAGNETIC SENSOR

BACKGROUND

1. Technical Field

The present invention relates to a magnetic sensor.

2. Related Art

Patent document 1-6 discloses a magnetic sensor comprising a conductive supporting part which supports a signal processing IC and a magnetoelectric conversion unit, which measures a magnitude of a magnetic field.

RELATED ART DOCUMENTS

Patent Documents

Patent Document 1: U.S. Pat. No. 9,812,588 specification
Patent Document 2: U.S. Pat. No. 9,733,280 specification
Patent Document 3: U.S. Pat. No. 8,629,539 specification
Patent Document 4: U.S. patent Ser. No. 11/226,382 specification
Patent Document 5: U.S. patent Ser. No. 11/340,318 specification
Patent Document 6: U.S. Patent Application Publication No. 2019/0346515 specification

DESCRIPTION OF EXEMPLARY EMBODIMENTS

Hereinafter, embodiments of the present invention will be described. However, the following embodiments are not for limiting the invention according to the claims. In addition, not all combinations of features described in the embodiment are essential to the solution of the invention.

A magnetic sensor is used in various applications for measuring a magnitude of a magnetic field. For example, a magnetic sensor may be used for an electric vehicle to measure the magnetic field generated by a current flowing through a busbar in an inverter circuitry for controlling a motor. Since fast transistors of SiC or GaN having low ON resistance are recently used for the inverter circuitry, the magnetic sensor is desired to be able to respond to a high-frequency magnetic field.

The magnetic sensor includes a magnetoelectric conversion element having a magnetoelectric conversion unit which detects a magnetic field and converts it to an electrical signal, and a signal processing IC comprising a signal processing circuit. The magnetic sensor is provided as a semiconductor package obtained by encapsulating the magnetoelectric conversion element, the signal processing IC, and a die pad which is a supporting part in a form of a conductive flat plate supporting the magnetoelectric conversion element and the signal processing IC with mold resin. It is known that when a high-frequency magnetic field is input to the magnetic sensor, an eddy current occurs in the conductive flat plate and a frequency response worsens.

For example, in Patent document 1, a magnetic sensor is disclosed composed of a signal processing IC comprising a magnetoelectric conversion unit, a supporting part supporting the signal processing IC, and a plurality of capacitors. The magnetic sensor described in Patent document 1 having a die pad formed with a conductive lead frame and being provided with a plurality of gaps in the die pad eliminates an eddy current that occurs in an outer periphery of the die pad with no gap and suppresses a worsening of a frequency response due to the eddy current.

However, in Patent document 1, the gap of the die pad is merely provided for the purpose of cutting a path of the eddy current. Therefore, an improvement of the frequency response of the magnetic sensor is limited, and it cannot be expected in a higher frequency.

Therefore, in the magnetic sensor according to the present embodiment, the relationship between the eddy current that occurs in the die pad and the magnetic field input to the magnetoelectric conversion unit is found, and an optimal configuration is proposed to provide a small magnetic sensor with an excellent frequency response in a higher frequency.

Figure 1A:
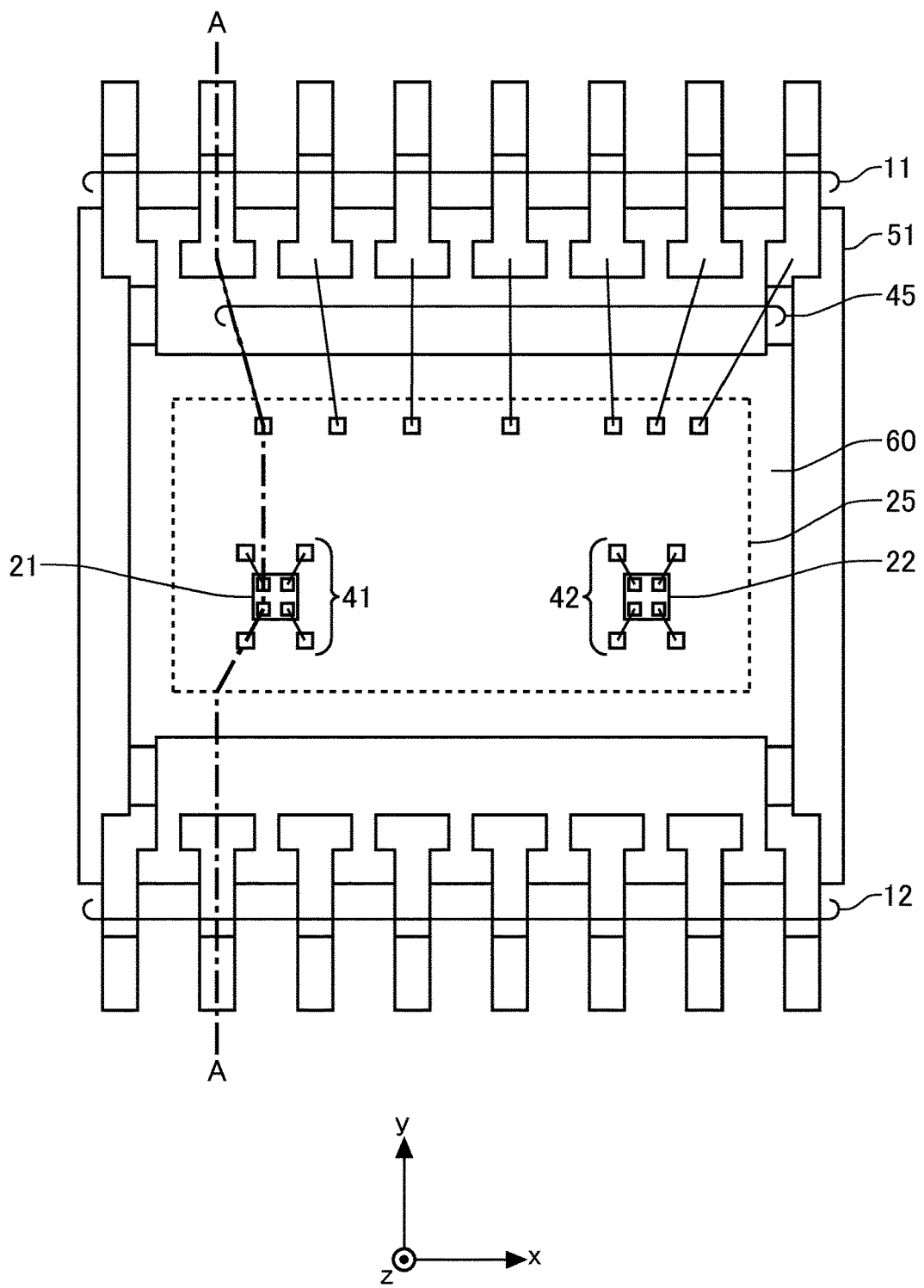
FIG. 1A is a top view of a configuration of an interior of a semiconductor package of a magnetic sensor comprising a die pad with no gap.
Figure 1B:
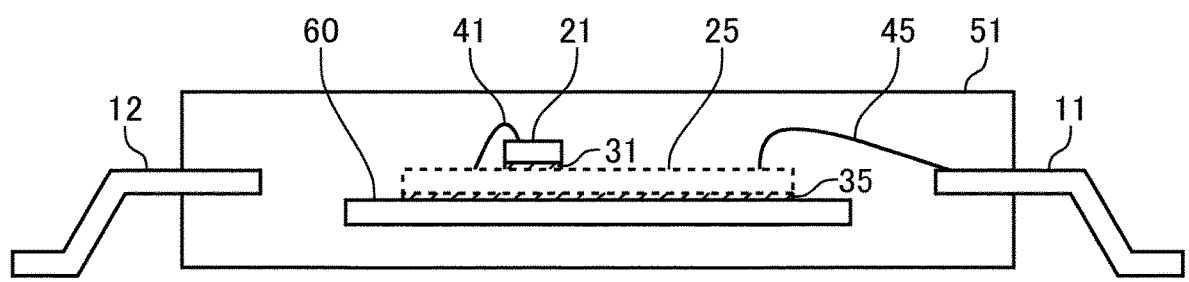
FIG. 1B is an A-A line sectional view of FIG. 1A.
Figure 1B:
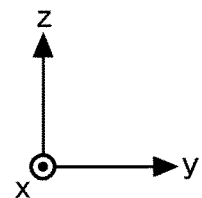

FIG. 1A and FIG. 1B illustrate configurations of an interior of a semiconductor package of a magnetic sensor 100 comprising a die pad 60 with no gap. FIG. 1A is a top view (a plan view seen from the z axis direction) of the configuration of an interior of the semiconductor package, and FIG. 1B is an A-A line sectional view of FIG. 1A. The magnetic sensor 100 includes lead terminals 11 and 12 for signal input/output, magnetoelectric conversion elements 21 and 22, a signal processing IC 25, adhesive layers 31 and 35, wires 41, 42, and 45, an encapsulating portion 51, and a die pad 60.

In FIG. 1A, the coordinates are defined as below: the orientation from left to right in a plane parallel to the sheet of paper is the x axis direction, the orientation from bottom to top in a plane parallel to the sheet of paper is the y axis direction, and the orientation from back to front in a plane vertical to the sheet of paper is the z axis direction. Any one axis of the x axis, the y axis and the z axis is orthogonal to another axis. The x axis direction is an example of the first direction and the y axis direction is an example of the second direction.

Two magnetoelectric conversion elements 21 and 22 each having a magnetoelectric conversion unit on a surface of the +z axis direction side thereof detect a magnetic field in the z axis direction, and a signal processing circuit provided on a surface of the +z axis direction side of the signal processing IC 25 amplifies a signal of the magnetoelectric conversion element according to a magnitude of the magnetic field and outputs it from the lead terminal 11.

The magnetoelectric conversion elements 21 and 22 are cut out in a rectangular or a square shape in a plan view (a plan view seen from the z axis direction). The magnetoelectric conversion elements 21 and 22 may each have a substrate composed of silicon or a compound semiconductor and the magnetoelectric conversion unit provided on the substrate. The magnetoelectric conversion unit is a part that detects a magnetic field and converts it to an electrical signal. The thickness of the substrate is adjusted by polishing a surface of the −z axis direction side. The substrate may have a desired thickness in the range of 50 μm to 300 μm. The magnetoelectric conversion elements 21 and 22 output a positive voltage when a magnetic field has occurred in the orientation of +z axis direction. Hall element is suitable for the magnetoelectric conversion elements 21 and 22, since they detect the magnetic field in the z axis direction.

The signal processing IC 25 is cut out in a rectangular or square shape in the plan view. The signal processing IC 25 has a first surface facing the die pad 60, and a second surface opposite the first surface and on which the signal processing circuit is formed. The signal processing IC 25 is formed of a silicon substrate or a compound semiconductor substrate, and a desired thickness in the range of 50 μm to 400 μm is selected by polishing a surface of the −z axis direction side thereof. The signal processing circuit of the signal processing IC 25 is provided with a circuit for inputting thereto quite small output signals from the magnetoelectric conversion elements 21 and 22 according to a magnitude of a magnetic field, and at least amplifying input signals. Herein, the signal processing circuit of the signal processing IC 25 inputs output signals of the magnetoelectric conversion elements 21 and 22, and calculates the sum of respective output signals.

The wires 41 and 42 electrically connect electrode pads provided on the signal processing IC 25 and electrode pads provided on the magnetoelectric conversion elements 21 and 22, respectively. The wire 45 electrically connects electrode pads provided on the signal processing IC 25 and bonding pads provided on the lead terminal 11. In addition, the wires 41 and 42 and the wire 45 may be formed of a conductor material of which main component being Au, Ag, Cu, or Al.

The die pad 60 may be composed of a lead frame of a conductor material of which main component being Cu, together with the lead terminals 11 and 12. A desired thickness in the range of 50 μm to 400 μm may be selected for the lead frame. The lead terminal 11 is a lead for power supply to the signal processing circuit of the signal processing IC 25 and input/output of a signal. Although it does not have a wire connection in the figure, the lead terminal 12 may similarly be a lead for power supply to the signal processing circuit of the signal processing IC 25 and input/output of a signal. The die pad 60 is a land on which the signal processing IC 25 is mounted.

The die pad 60 is composed by a rectangular conductive flat plate which is wider than the signal processing IC 25 in a plan view, and supports the signal processing IC 25. The die pad 60 is integrally composed with the lead terminals 11 and 12. The die pad 60 has leads of parts of the lead terminals 11 and 12 connected thereto, which extends to be bent to the −z axis direction side. The die pad 60 may be integrally composed with a suspension lead supporting the encapsulating portion 51 to be formed, through an assembly process, which is not illustrated.

The magnetoelectric conversion element 21 is bonded to the signal processing IC 25 via the adhesive layer 31, and the magnetoelectric conversion element 22 is similarly bonded to the signal processing IC 25 via the adhesive layer 32 (not illustrated). In addition, the signal processing IC 25 is bonded to the die pad 60 via the adhesive layer 35. The adhesive layers 31 and 32 and the adhesive layer 35 may be die-attach films.

The adhesive layers 31 and 32 and the adhesive layer 35 may be the same size as the magnetoelectric conversion elements 21 and 22 and the signal processing IC 25 in the plan view. The adhesive layers 31 and 32 and the adhesive layer 35 may be die-attach films composed of non-conductive resin, or may be die-attach films composed of conductive resin. The non-conductive resin may be an epoxy-based or a silicone-based resin. The conductive resin may be an epoxy-based resin mixed with the filler of Ag. The adhesive layers 31 and 32 and the adhesive layer 35 have desired thicknesses in the range of 1 µm to 50 µm. The adhesive layers 31 and 32 and the adhesive layer 35 may be pastes composed to be conductive or non-conductive.

The encapsulation portion 51 encapsulates the magnetoelectric conversion elements 21 and 22, the signal processing IC 25, the die pad 60, the wires 41 and 42, and the wire 45 with mold resin. The mold resin may be, for example, comprised of an epoxy-based thermosetting resin added with silica and formed into a semiconductor package by a transfer molding. Since it is formed into a semiconductor package, the magnetic sensor 100 can be achieved to be small.

However, since the magnetic sensor 100 has the die pad 60 composed of a wide conductive flat plate, an eddy current occurs in the die pad 60 when the frequency of an external input magnetic field in the z axis direction is high. The magnetoelectric conversion unit of each of the magnetoelectric conversion elements 21 and 22 input a magnetic field generated by the eddy current, in addition to the external input magnetic field in the z axis direction to be detected, therefore a frequency response of the magnetic sensor 100 significantly worsens.

Figure 2:
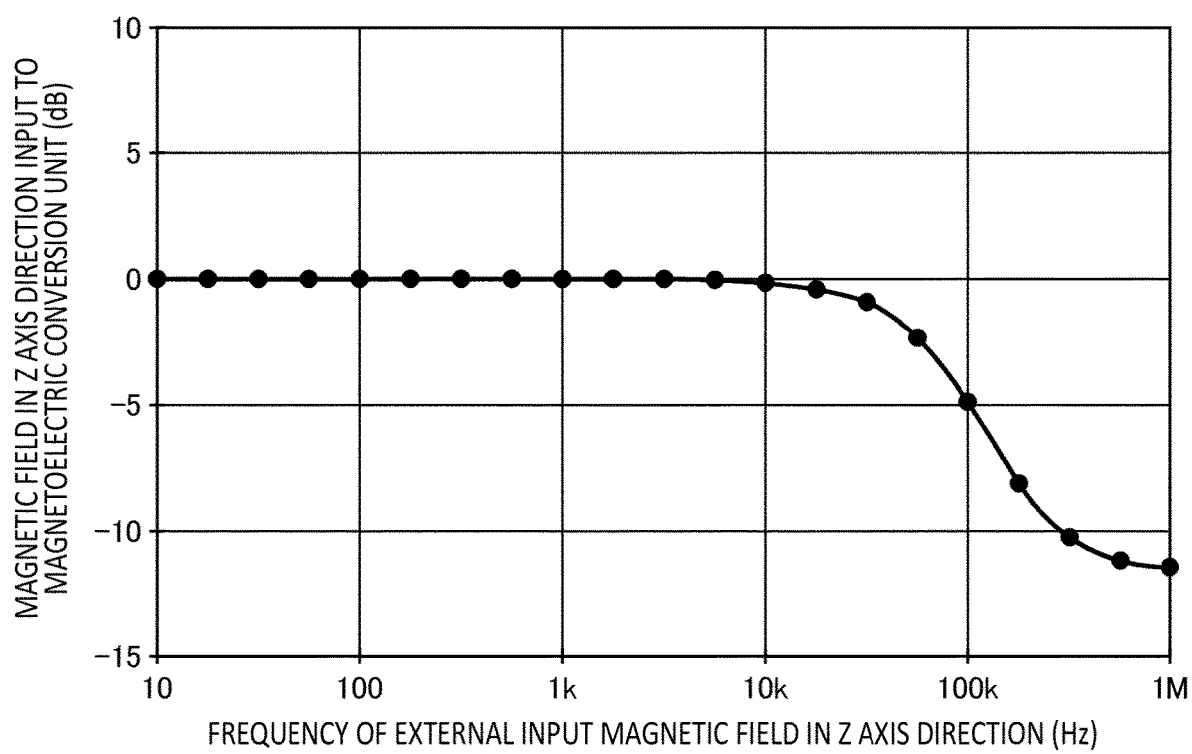
FIG. 2 illustrates a simulation result on the frequency response of a magnetic field in the z axis direction input to the magnetoelectric conversion unit of the magnetoelectric conversion element with respect to an external input magnetic field in the z axis direction of the magnetic sensor illustrated in FIG. 1A.

FIG. 2 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100. As an example, the die pad 60 illustrated in FIG. 1A and FIG. 1B has a length in the x axis direction of 4.45 mm, a width in the y axis direction of 2.57 mm, and a thickness in the z axis direction of 0.125 mm. The center of the magnetoelectric conversion unit of the magnetoelectric conversion element 21 is positioned at a distance from a surface on the +z axis direction side of the die pad 60 of 0.27 mm, a distance from a surface on the −x axis direction side of the die pad 60 of 0.975 mm, and a distance from a surface on the −y axis direction side of the die pad 60 of 0.955 mm. The die pad 60 may be formed of Cu, and may have a conductivity of $59.5 \times 10^6$ S/m. The external input magnetic field in the z axis direction has a constant amplitude in a whole frequency range.

The frequency response is drawn by normalizing the magnetic field in the z axis direction input to the magnetoelectric conversion unit of the magnetoelectric conversion element 21 to be 0 dB (=1) when the frequency of the external input magnetic field in the z axis direction is 10 Hz.

The magnetic field in the z axis direction input to the magnetoelectric conversion unit of the magnetoelectric conversion element 21 was maintained to be 0 dB up to near 10 kHz of the external input magnetic field in the z axis direction, and started to decrease from near 10 kHz, and was down 3 dB at 66 kHz. In this case, for example, when the external input magnetic field in the z axis direction changes from 0 mT to 1 mT in a short time period, a response time at which the magnetic field in the z axis direction input to the magnetoelectric conversion unit of the magnetoelectric conversion element 21 reaches 1 mT becomes about 5 usec. It can be said that the magnetic sensor 100 is not suitable for applications in which the external input magnetic field changes rapidly. Herein, although a result on frequency responses of a magnetic field in the z axis direction input to the magnetoelectric conversion unit of the magnetoelectric conversion element 22 is not shown, it is the same as that of the magnetoelectric conversion element 21.

Figure 3:
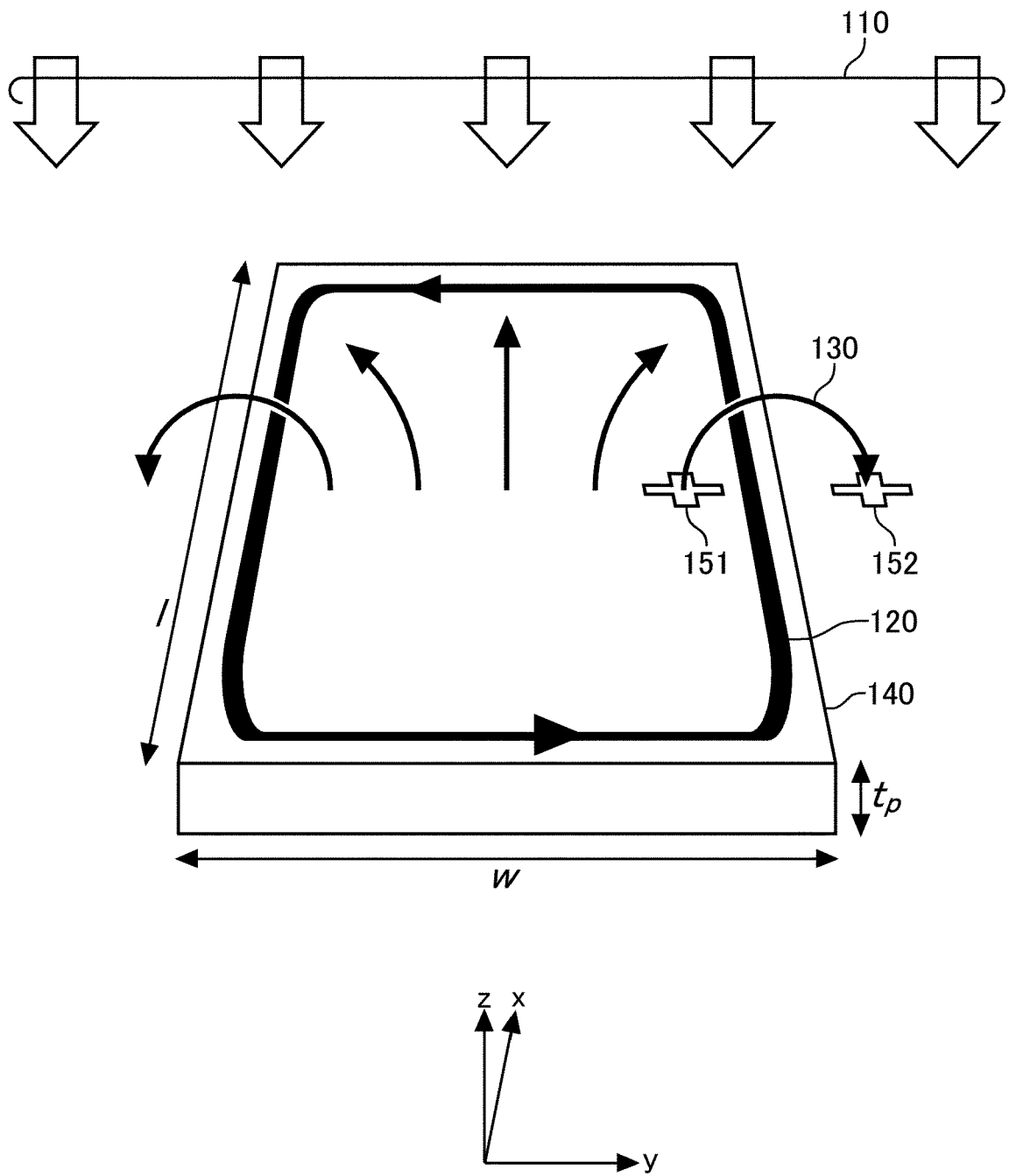
FIG. 3 illustrates an eddy current that occurs in a conductive flat plate composing a die pad and a magnetic field generated by the eddy current.

FIG. 3 illustrates an eddy current that occurs in a conductive flat plate 140 composing the die pad 60 and a magnetic field generated by the eddy current. When the conductive flat plate 140 is placed in a magnetic field of an external input magnetic flux density 110, an eddy current 120 occurs in the conductive flat plate 140. Further, a magnetic field of a counter magnetic flux density 130 is generated by the eddy current 120.

In FIG. 3, the coordinates are defined as below: the orientation from back to front in a plane vertical to the sheet of paper is the x axis direction, the orientation from left to right in a plane parallel to the sheet of paper is the y axis direction, and the orientation from bottom to top in a plane parallel to the sheet of paper is the z axis direction. Any one axis of the x axis, the y axis and the z axis is orthogonal to another axis.

The conductive flat plate 140 is flatly arranged on the xy plane, having a length l in the x axis direction, a width w in the y axis direction, and a thickness $t_p$ in the z axis direction. The external input magnetic flux density 110 has a frequency f, and is uniformly applied to the conductive flat plate 140 in the −z axis direction. The external input magnetic flux density 110 is given by the following expression:

[Expression 1]

$$B_{in} = B_0 \sin(2\pi f t) \quad (1)$$

Herein, $B_{in}$ represents the value of external input magnetic flux density 110, $B_0$ represents an amplitude of the external input magnetic flux density 110, and t represents a time.

At this time, an eddy current 120 occurs in the conductive flat plate 140, which generates the counter magnetic flux density 130 which tries to prevent the external input magnetic flux density 110 from changing. The eddy current 120 flows densely in the vicinity of a side surface of the conductive flat plate 140, as seen from the z axis direction. The eddy current 120 is given by the following expression:

[Expression 2]

$$I_{eddy} = \frac{1}{R} \cdot \frac{d\phi_{in}}{dt} = \frac{\sigma t_p}{2(l+w)} \cdot (wl) \frac{dB_{in}}{dt} \quad (2)$$
$$= \frac{\sigma t_p}{2(1+w/l)} \cdot w \frac{dB_{in}}{dt}$$

Herein, $I_{eddy}$ represents the eddy current 120. R represents a resistance in a flow path of the eddy current 120. $\phi_{in}$ represents the external input magnetic flux. σ represents a conductivity of the conductive flat plate 140. The length of the flow path of the eddy current 120 can be represented by a length of an outer periphery of the conductive flat plate 140 at most, so it is defined as 2 (l+w). Therefore, the resistance R through the flow path of the eddy current 120 is expressed by 2 (l+w)/(σ$t_p$).

If the length l of the conductive flat plate 140 is significantly larger than the width w, w/l in expression (2) can be considered to be approximately 0. At this time, from expression (2), the eddy current 120 can be obtained by the following expression:

[Expression 3]

$$I_{eddy} \propto \sigma w t_p f B_0 \cos(2\pi f t) \quad (3)$$

From expression (3), it is understood that, if the amplitude $B_0$ and the frequency f of the external input magnetic flux density 110 are constant, the eddy current 120 becomes small when the conductivity σ is small or the width w of the conductive flat plate 140 is narrow or alternatively when the thickness $t_p$ of the conductive flat plate 140 is thin. In addition, it is understood that the eddy current 120 does not change however large the length of the conductive flat plate 140 may be, since the component of length l of the conductive flat plate 140 does not appear in expression (3). Each of magnetoelectric conversion units 151 and 152 representing a part of the magnetoelectric conversion element detects a magnetic field and converts it to an electrical signal. Herein, the magnetoelectric conversion element is not illustrated. The magnetoelectric conversion units 151 and 152 are on a surface parallel to a surface on the +z axis direction side of the conductive flat plate 140, and the magnetoelectric conversion unit 151 is arranged on the inside of the conductive flat plate 140 and the magnetoelectric conversion unit 152 is arranged on the outside of the conductive flat plate 140, respectively. The counter magnetic flux density 130 generated by the eddy current 120 which has a magnitude proportional to the eddy current 120 and dependent on a distance from the eddy current 120 occurs at respective positions. As understood from FIG. 3, a −z axis direction component of the external input magnetic flux density and a +z axis direction component of the counter magnetic flux density 130 are input to the magnetoelectric conversion unit 151. In addition, a −z axis direction component of the external input magnetic flux density and a −z axis direction component of the counter magnetic flux density 130 are input to the magnetoelectric conversion unit 152. The magnetoelectric conversion units 151 and 152 have opposite z axis direction components of the counter magnetic flux density 130 respectively input thereto.

A magnetic flux density $B_{inside}$ input to the magnetoelectric conversion unit 151 is given by the following expression, with the orientation of the magnetic flux density being positive in the −z axis direction.

[Expression 4]

$$B_{inside} = B_{in} - B_{counter} \quad (4)$$
$$= B_0 \{\sin(2\pi f t) - K_{inside} \cos(2\pi f t)\} \propto B_0 \sin(2\pi f t - \theta)$$

Herein, $B_{counter}$ represents the counter magnetic flux density 130. $K_{inside}$ represents a constant including a factor according to a distance from the eddy current 120 and a frequency component. θ represents a phase.

From expression (4), the magnetic flux density $B_{inside}$ input to the magnetoelectric conversion unit 151 has a response in which the phase is delayed by θ with respect to the external input magnetic flux density 110.

On the other hand, a magnetic density $B_{outside}$ input to the magnetoelectric conversion unit 152 is given by the following expression.

[Expression 5]

$$B_{outside} = B_{in} + B_{counter} \quad (5)$$
$$= B_0 \{\sin(2\pi f t) + K_{outside} \cos(2\pi f t)\} \propto B_0 \sin(2\pi f t + \theta)$$

Herein, $K_{outside}$ represents a constant including a factor according to a distance from the eddy current 120 and a frequency component.

From expression (5), the magnetic density $B_{outside}$ input to the magnetoelectric conversion unit 152 has a response in which the phase is advanced by θ with respect to the external input magnetic flux density 110.

From expression (4) and expression (5), since the phases of the magnetoelectric conversion unit 151 arrange on the inside of the conductive flat plate 140 and the magnetoelectric conversion unit 152 arranged on the outside thereof are respectively delayed and advanced with respect to the external input magnetic flux density 110, frequency responses of the magnetic flux density input to each of the magnetoelectric conversion units 151 and 152 have different behaviors.

Herein, the frequency responses of the magnetic flux density input to each of the magnetoelectric conversion units 151 and 152 will be further described. First, the magnetic flux density $B_{inside}$ input to the magnetoelectric conversion unit 151 is given by the following expression, by using $I_{eddy}$ of expression (2).

[Expression 6]

$$B_{inside} = B_{in} - B_{counter} = B_{in} - \alpha \cdot I_{eddy} \quad (6)$$
$$= B_{in} - \alpha \cdot \left(\gamma \sigma w t_p \frac{dB_{in}}{dt}\right)$$

Herein, α represents a constant including a factor according to a distance from the eddy current 120. γ represents a constant including a factor according to a dimension of the conductive flat plate 140. From expression (6), the relationship between $B_{inside}$ and $B_{in}$ can be expressed by a first-order differential equation, so the following equation can be obtained by Laplace transformation.

[Expression 7]

$$\frac{B_{inside}(s)}{B_{in}(s)} = \frac{1}{1(\sigma w t_p \alpha \gamma)s} \quad (7)$$

From expression (7), the magnetic flux density $B_{inside}$ input to the magnetoelectric conversion unit 151 shows a frequency response delayed by first-order with respect to the external input magnetic flux density 110, and the pole frequency $f_p$ thereof becomes $1/(2\pi \sigma w t_p \alpha \gamma)$.

Next, the magnetic density $B_{outside}$ input to the magnetoelectric conversion unit 152 is given by the following expression, by using $I_{eddy}$ of expression (2).

[Expression 8]

$$B_{outside} = B_{in} + B_{counter} = B_{in} + \beta \cdot I_{eddy} \quad (8)$$
$$= B_{in} + \beta \cdot \left(\gamma \sigma w t_p \frac{dB_{in}}{dt}\right)$$

Herein, $\beta$ represents a constant including a factor according to a distance from the eddy current 120.

From expression (8), the relationship between $B_{outside}$ and $B_{in}$ can be expressed by a first-order differential equation, so the following equation can be obtained by Laplace transformation.

[Expression 9]

$$\frac{B_{outside}(s)}{B_{in}(s)} = 1 + (\sigma w t_p \beta \gamma)s \quad (9)$$

From expression (9), the magnetic density $B_{outside}$ input to the magnetoelectric conversion unit 152 shows a frequency response advanced by first-order with respect to the external input magnetic flux density 110, and the zero frequency $f_z$ thereof becomes $1/(2\pi w t_p \beta \gamma)$.

Figure 4:
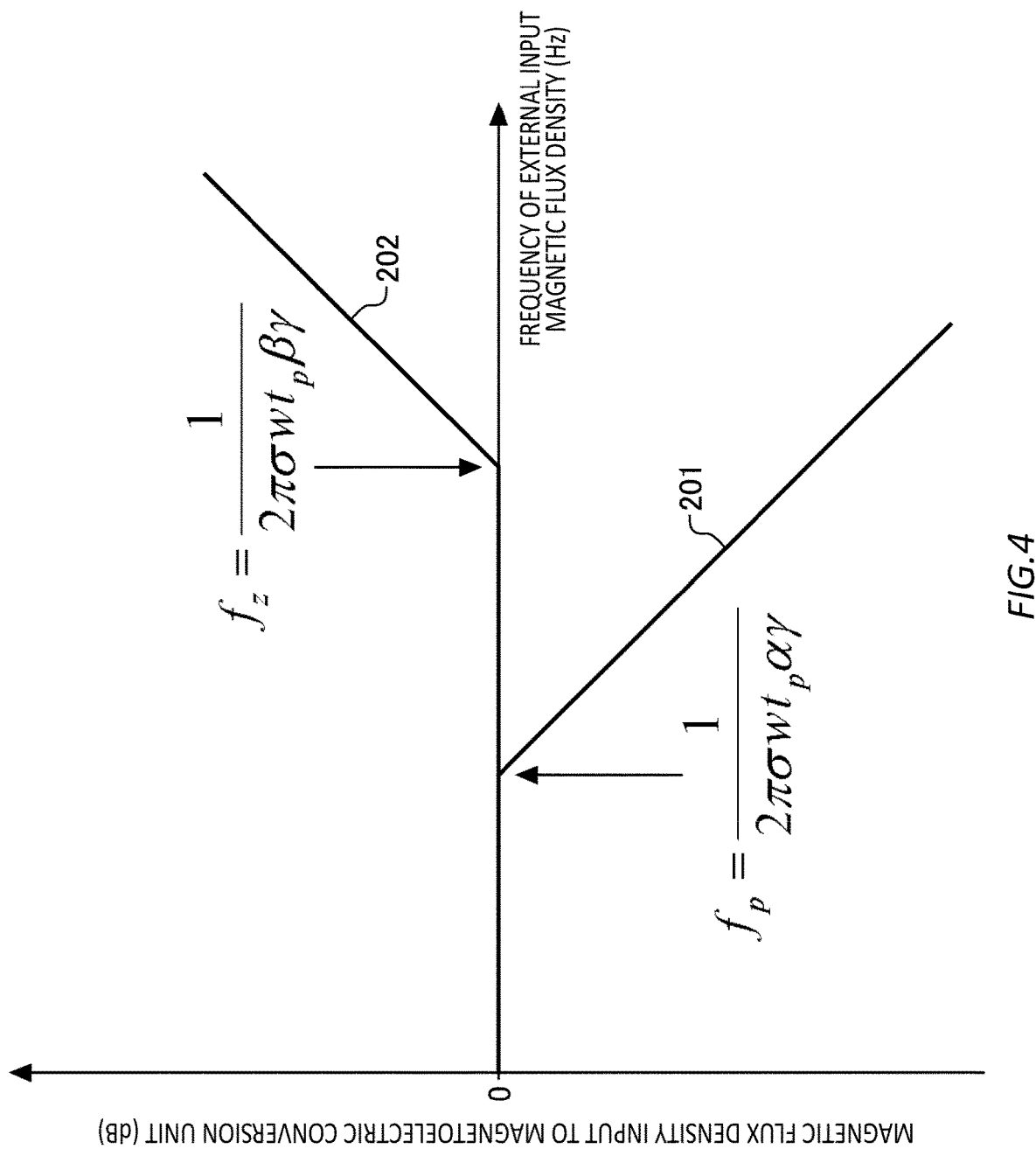
FIG. 4 illustrates the frequency responses of magnetic flux densities input to the magnetoelectric conversion units with respect to the external input magnetic flux density in a simple manner.

FIG. 4 illustrates the frequency responses of the magnetic flux densities input to the magnetoelectric conversion units 151 and 152 with respect to the external input magnetic flux density 110 in a simple manner. The frequency responses are drawn by normalizing them based on the external input magnetic flux density with a constant amplitude in a whole frequency range. The characteristic curves 201 and 202 are curves of the frequency responses of the magnetic flux densities input to the magnetoelectric conversion units 151 and 152, respectively.

In the characteristic curve 201, the magnetic flux density input to the magnetoelectric conversion unit 151 is 0 dB when the frequency of the external input magnetic flux density 110 is lower than the pole frequency $f_p$, and the magnetic flux density input to the magnetoelectric conversion unit 151 decreases as a function of 1/f when the frequency of the external input magnetic flux density 110 is higher than the pole frequency $f_p$. On the other hand, in the characteristic curve 202, the magnetic flux density input to the magnetoelectric conversion unit 152 is 0 dB when the frequency of the external input magnetic flux density 110 is lower than the zero frequency $f_z$, and the magnetic flux density input to the magnetoelectric conversion unit 152 increases as a function of f when the frequency of the external input magnetic flux density 110 is higher than the zero frequency $f_z$.

That is, in the plan view, the magnetic flux density input to the magnetoelectric conversion unit 151 arranged to be overlapped with the conductive flat plate 140 decreases at the frequency over the pole frequency $f_p$ of the external input magnetic flux density 110. In addition, in the plan view, the magnetic flux density input to the magnetoelectric conversion unit 152 arranged so as not to overlap with the conductive flat plate 140 increases at the frequency over the zero frequency $f_z$ of the external input magnetic flux density 110.

From the above, it can be described that, for the magnetic sensor 100 comprising the die pad 60 with no gap, since the magnetoelectric conversion unit of the magnetoelectric conversion element 21 is arranged to be overlapped with the die pad 60 with a wide width in the plan view, the magnetic field in the z axis direction input to the magnetoelectric conversion unit of the magnetoelectric conversion element 21 was maintained to be 0 dB up to near 10 kHz of the external input magnetic field, started to decrease at near 10 kHz, and became 3 dB down at 66 kHz which is the pole frequency $f_p$.

Therefore, it is necessary to broaden a range of the frequency in order for the magnetic sensor 100 to rapidly respond to the external input magnetic field. From the relationship between the eddy current that occurs in the conductive flat plate and the magnetic field input to the magnetoelectric conversion unit, as found by the inventor described above, first, according to the most effective method to suppress a decrease in the magnetic field input to the magnetoelectric conversion unit in the frequency response, the center of the magnetoelectric conversion unit of the magnetoelectric conversion element 21 may be arranged so as not to overlap with the die pad 60 in the plan view.

Then, in order to broaden a range of frequency in which the magnetic field input to the magnetoelectric conversion unit of the magnetoelectric conversion element 21 is 0 dB, the zero frequency $f_z$ may be increased. Parameters constituting the zero frequency $f_z$ are conductivity $\sigma$, the width w, the thickness $t_p$ of the conductive flat plate composing the die pad 60, a constant $\beta$ including a factor according to a distance from the eddy current, a constant $\gamma$ including a factor according to a dimension of the conductive flat plate 140. The zero frequency $f_z$ is increased and the 0 dB range is broadened by reducing any of the parameter. Among these parameters, the width w of the conductive flat plate composing the die pad 60 is most easily designed, and most effective in achieving a frequency range improvement, so it is desirable to reduce the width w.

Figure 5A:
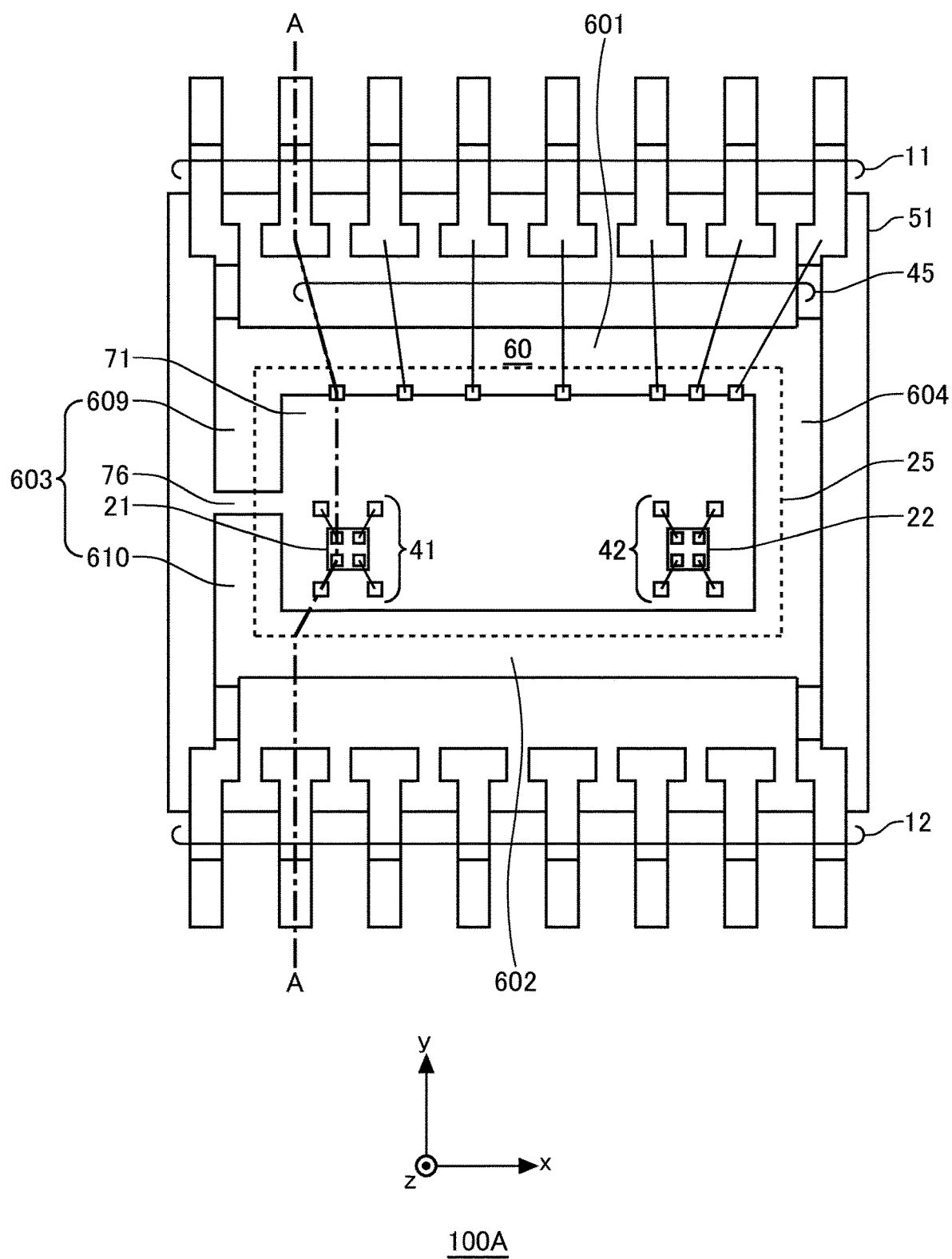
FIG. 5A is a top view of a configuration of an interior of a semiconductor package of a magnetic sensor in Example 1.
Figure 5B:
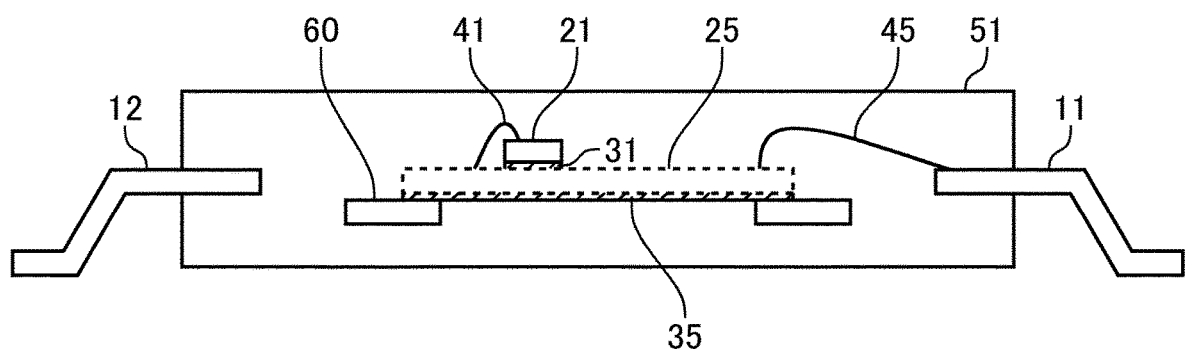
FIG. 5B is an A-A line sectional view of FIG. 5A.

[Example 1] FIG. 5A and FIG. 5B illustrate configurations of an interior of a semiconductor package of a magnetic sensor 100A according to Example 1 in the present embodiment. FIG. 5A illustrates a top view (a plan view seen from the z axis direction) of the configuration of an interior of the semiconductor package. FIG. 5B is an A-A line sectional view of FIG. 5A. Regarding reference numerals in the figures, the same reference numerals are given to components having the same function in FIG. 1A and FIG. 1B.

The magnetic sensor 100A in Example 1 have a shape of the conductive flat plate composing the die pad 60, which is different from that of the magnetic sensor 100 illustrated in FIG. 1A and FIG. 1B. The die pad 60 includes a first frame portion 601 extending along the x axis direction, a second frame portion 602 extending along the x axis direction, facing the first frame portion 601 in the y axis direction intersecting the x axis direction, and spaced apart from the first frame portion 601, and a third frame portion 603 and a fourth frame portion 604 extending along the y axis direction between the first frame portion 601 and the second frame portion 602. The third frame portion 603 includes a ninth frame portion 609 extending along the y axis direction from one end of the first frame portion 601 toward the second frame portion 602, and a tenth frame portion 610 extending along the y axis direction from one end of the second frame portion 602 toward the first frame portion 601, facing the ninth frame portion 609 in the y axis direction, and spaced apart from the ninth frame portion 609. The fourth frame portion 604 extends along the y axis direction from the other end of the first frame portion 601 toward the second frame portion 602, and couples to the other end of the second frame portion 602.

The die pad 60 has a C shape in the plan view. There is a first gap 76 between the ninth frame portion 609 and the tenth frame portion 610. The die pad 60 has a space portion 71 surrounded by the first frame portion 601, the second frame portion 602, the ninth frame portion 609, the tenth frame portion 610, and the fourth frame portion 604 in the plan view. The first gap 76 is connected to the space portion 71. The magnetoelectric conversion elements 21 and 22 are arranged to face each other in the x axis direction in the space portion 71. The space portion 71 is an example of the first space portion.

The signal processing IC 25 is supported by the first frame portion 601, the second frame portion 602, the ninth frame portion 609, the tenth frame portion 610, and the fourth frame portion 604. The first frame portion 601, the second frame portion 602, the ninth frame portion 609, the tenth frame portion 610, and the fourth frame portion 604 each have a width that is equal to or smaller than a specific width, but may not have the same width.

The first frame portion 601 and the ninth frame portion 609, the second frame portion 602 and the tenth frame portion 610, the first frame portion 601 and the fourth frame portion 604, and the second frame portion 602 and the fourth frame portion 604 are respectively coupled to each other, each pair forming an L shape. Four corners of the signal processing IC 25 are supported by four L-shaped portions of the die pad 60. The ninth frame portion 609 and the tenth frame portion 610 are not coupled to each other, and a first gap 76 is provided between the ninth frame portion 609 and the tenth frame portion 610.

The signal processing IC 25 is bonded to the first frame portion 601, the second frame portion 602, the ninth frame portion 609, the tenth frame portion 610, and the fourth frame portion 604 via the adhesive layer 35. The signal processing IC 25 is stably fixed since the first surface near an outer periphery including the four corners of the signal processing IC 25 is bonded to the first frame portion 601, the second frame portion 602, the ninth frame portion 609, the tenth frame portion 610, and the fourth frame portion 604. The specific widths of the first frame portion 601, the second frame portion 602, the ninth frame portion 609, the tenth frame portion 610, and the fourth frame portion 604 are set such that a minimally-required zero frequency $f_z$ can be obtained for a range required according to the application. Although in FIG. 5A, the first frame portion 601, the second frame portion 602, the ninth frame portion 609, the tenth frame portion 610, and the fourth frame portion 604 includes portions that are outside the end surface of the signal processing IC 25 and portions that are inside the end surface in the plan view, they may exist only in portions that are inside the end surface of the signal processing IC 25.

The space portion 71 is provided with a first gap 76 between the ninth frame portion 609 and the tenth frame portion 610 so as not to be closed by being surrounded by the first frame portion 601, the second frame portion 602, the ninth frame portion 609, the tenth frame portion 610, and the fourth frame portion 604.

The first gap 76 may be provided in a part of the first frame portion 601, the second frame portion 602, or the fourth frame portion 604. A plurality of the first gaps 76 may be provided, but one first gap 76 is desirably provided for one space portion 71. In this manner, the frame portions forming four L shapes are coupled to be integrally composed, thereby allowing the signal processing IC 25 to be stably bonded thereto without any difference in the flatness level.

Figure 6:
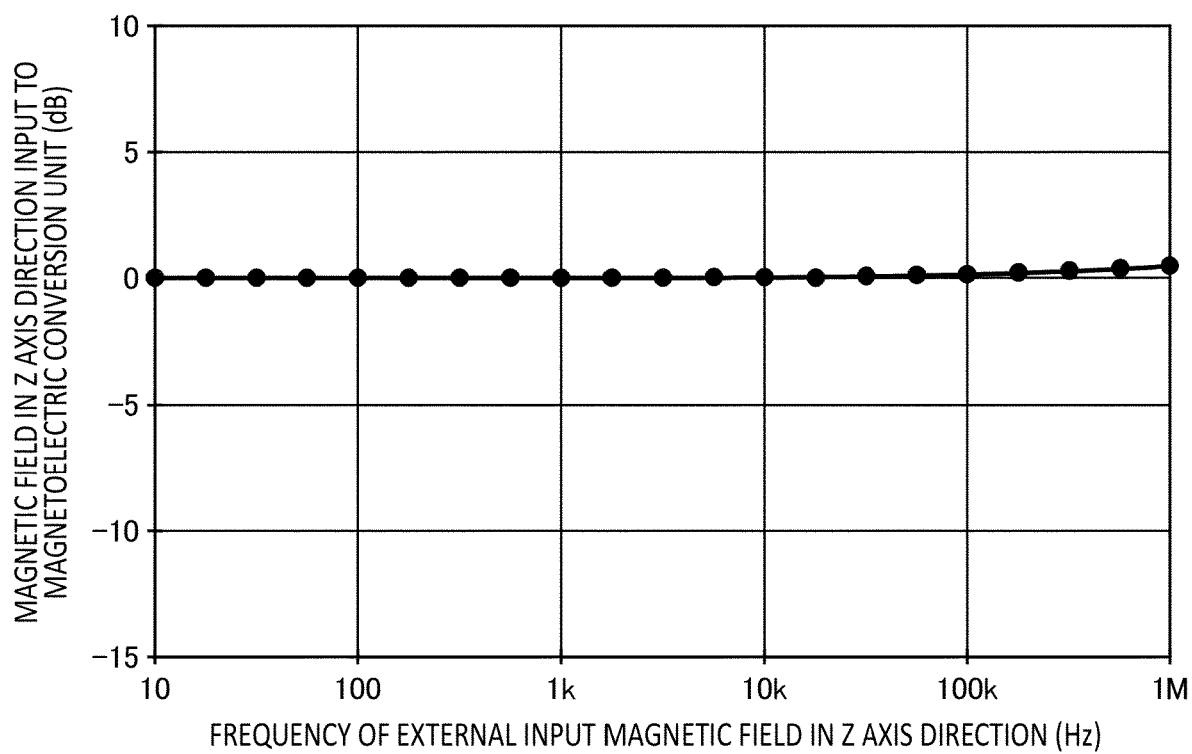
FIG. 6 illustrates a simulation result on the frequency response of a magnetic field in the z axis direction input to the magnetoelectric conversion unit of the magnetoelectric conversion element with respect to an external input magnetic field in the z axis direction of the magnetic sensor in Example 1.

FIG. 6 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100A. As an example, the width of the first frame portion 601, the second frame portion 602, the ninth frame portion 609, the tenth frame portion 610, and the fourth frame portion 604 of the die pad 60 illustrated in FIG. 5A is 0.5 mm. Other dimensions and parameters are the same as those in FIG. 2.

The magnetic field in the z axis direction input to the magnetoelectric conversion unit of the magnetoelectric conversion element 21 is maintained to be 0 dB up to near 100 kHz of the external input magnetic field in the z axis direction, starts to slightly increase from near 100 kHz, but the increase remains to be approximately 0.5 dB even at 1 MHz. Therefore, the frequency response of the magnetic sensor 100A of Example 1 is significantly improved as compared to the magnetic sensor 100 comprising the die pad 60 with no gap, and is suitable for applications in which the external input magnetic field changes rapidly. In addition, by selecting suitable widths for the first frame portion 601, the second frame portion 602, the ninth frame portion 609, the tenth frame portion 610, and the fourth frame portion 604 of the die pad 60, a magnetic sensor with an excellent frequency response in a higher frequency can be provided.

Figure 7A:
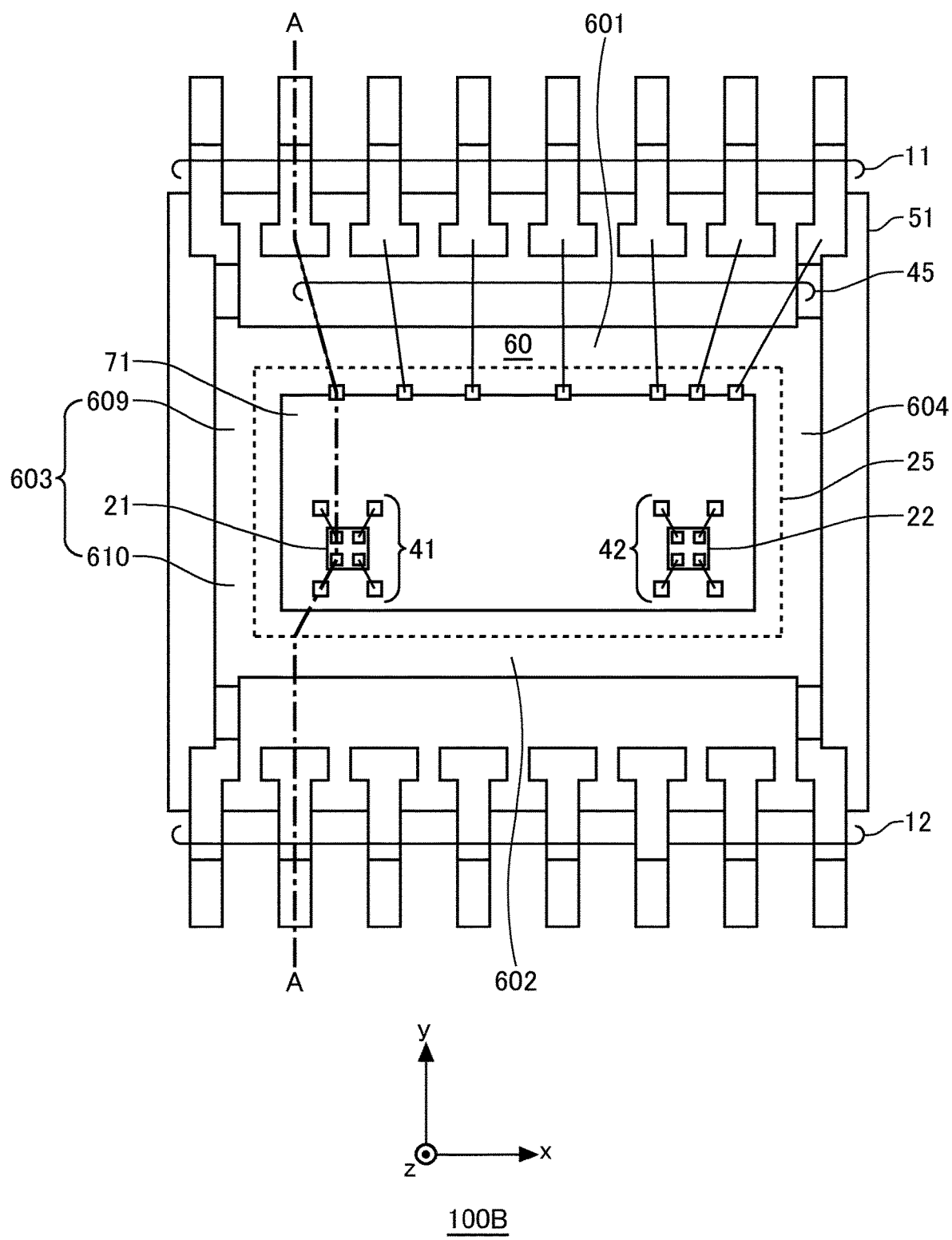
FIG. 7A is a top view of a configuration of an interior of a semiconductor package of the magnetic sensor with no gap provided in Example 1.
Figure 7B:
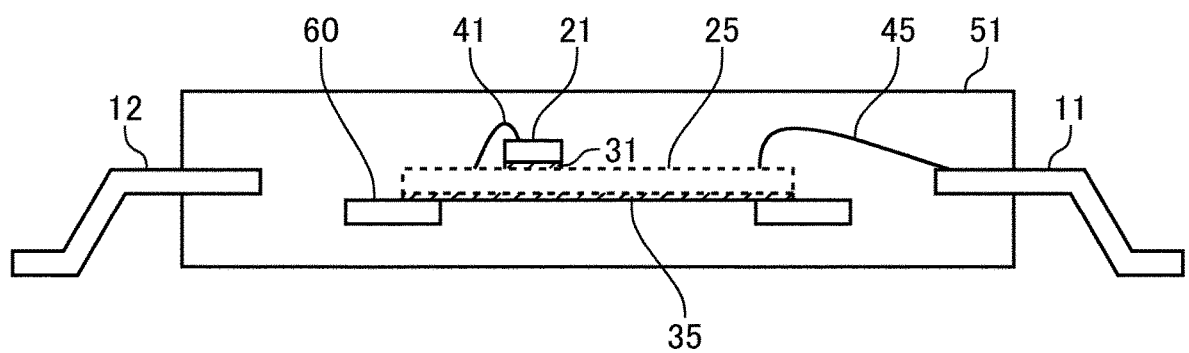
FIG. 7B is an A-A line sectional view of FIG. 7A.
Figure 7B:
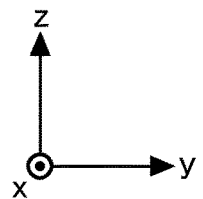

FIG. 7A and FIG. 7B illustrate configurations of an interior of a semiconductor package of a magnetic sensor 100B of a comparative example with no first gap 76 provided in Example 1, FIG. 7A being a top view (a plan view in the z axis direction) and FIG. 7B being an A-A line sectional view of FIG. 7A. Regarding reference numerals in the figures, the same reference numerals are given to components having the same function in FIG. 5A and FIG. 5B.

The magnetic sensor 100B of the comparative example differs from the magnetic sensor 100A of Example 1 in that it has a third frame portion 603 composed of the ninth frame portion 609 and the tenth frame portion 610 of the die pad 60 being coupled to each other, and the first gap 76 does not exist between the ninth frame portion 609 and the tenth frame portion 610.

The first frame portion 601, the second frame portion 602, the third frame portion 603, and the fourth frame portion 604 are all coupled together, forming a ring shape. A space portion 71 is provided such that it is closed by the first frame portion 601, the second frame portion 602, the third frame portion 603, and the fourth frame portion 604 coupled in a ring shape.

Figure 8:
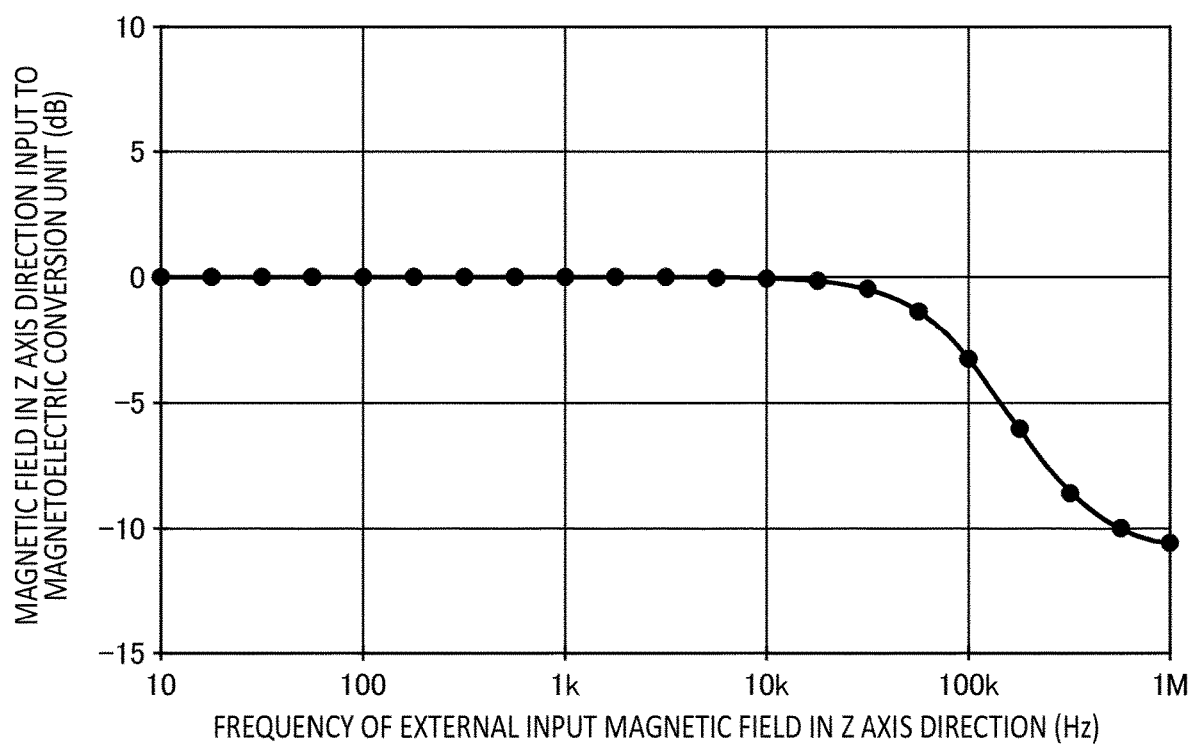
FIG. 8 illustrates a simulation result on the frequency response of a magnetic field in the z axis direction input to the magnetoelectric conversion unit of the magnetoelectric conversion element with respect to an external input magnetic field in the z axis direction of the magnetic sensor illustrated in FIG. 7A.

FIG. 8 illustrates a simulation result on the frequency response of a magnetic field in the z axis direction input to the magnetoelectric conversion unit of the magnetoelectric conversion element 21 with respect to the external input magnetic field in the z axis direction of the magnetic sensor 100B. The dimensions and parameters are the same as those in FIG. 6.

The magnetic field in the z axis direction input to the magnetoelectric conversion unit of the magnetoelectric conversion element 21 had approximately the same frequency response as that of the magnetic sensor 100 illustrated in FIG. 1A, where it is maintained to be 0 dB up to near 10 kHz of the external input magnetic field in the z axis direction, and starts to decrease from near 10 kHz, and is down 3 dB at 94 kHz. This is because an eddy current that occurs near an outer periphery of the first frame portion 601, the second frame portion 602, the third frame portion 603, the fourth frame portion 604 of the die pad 60 of the magnetic sensor 100B flows along the ring shape, and becomes the same as an eddy current that occurs in the die pad 60 of the magnetic sensor 100 illustrated in FIG. 1A. Therefore, it is important to have the space portion 71 existing in the inside of the L-shaped portion of the four corners of the die pad 60 configured so as not to be closed by providing a gap in at least one of the first frame portion 601, the second frame portion 602, the third frame portion 603, or the fourth frame portion 604, such as providing a first gap 76 between the ninth frame portion 609 and the tenth frame portion 610 for example.

Figure 9A:
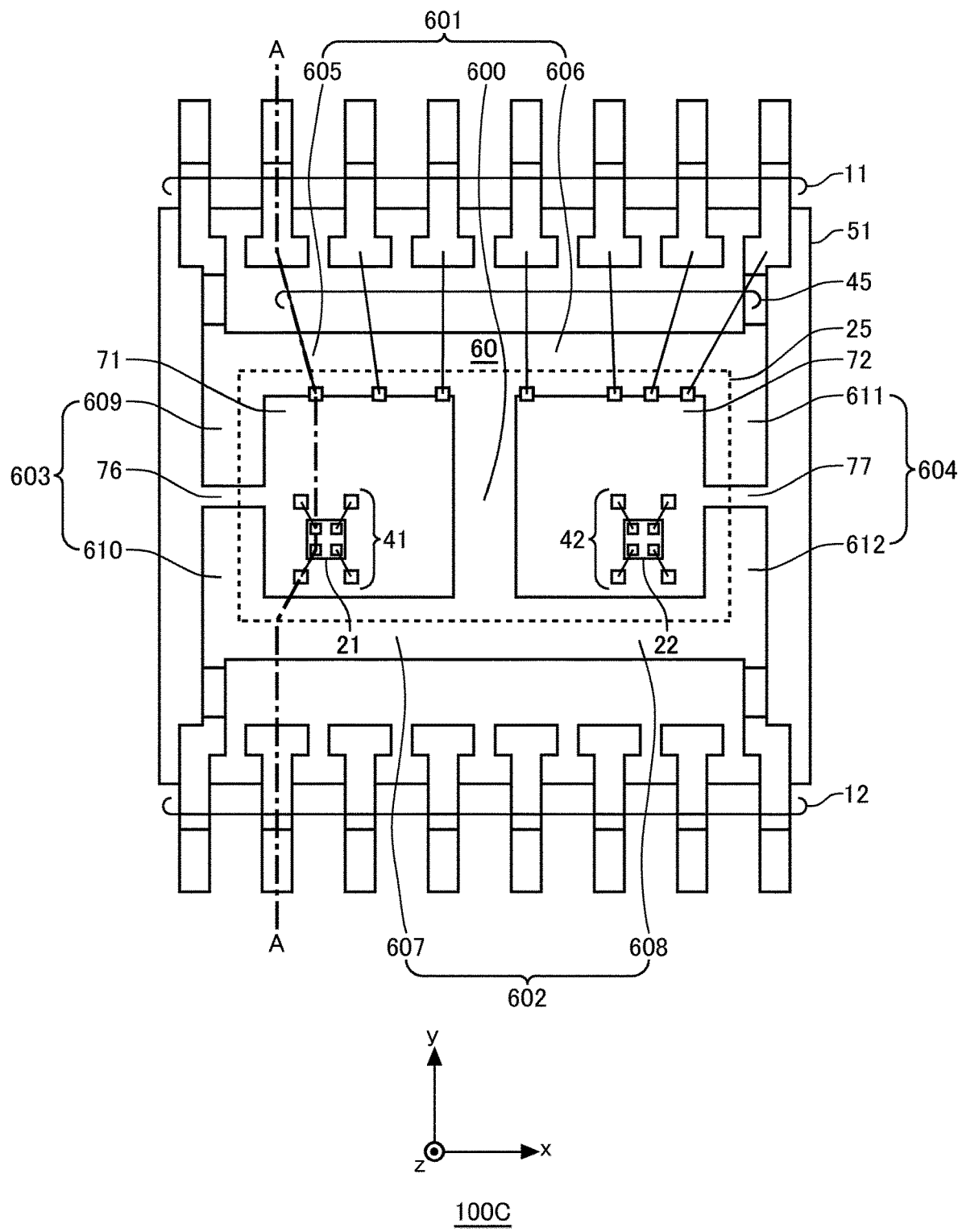
FIG. 9A is a top view of a configuration of an interior of a semiconductor package of a magnetic sensor according to Example 2.
Figure 9B:
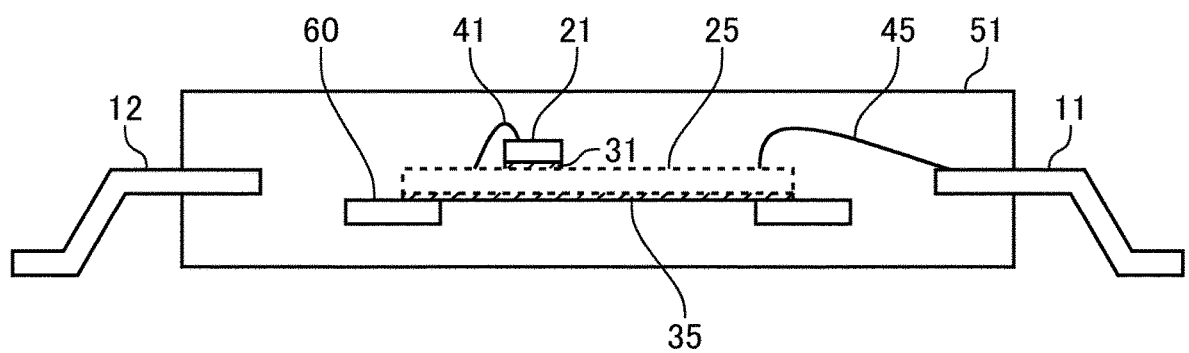
FIG. 9B is an A-A line sectional view of FIG. 9A.
Figure 9B:
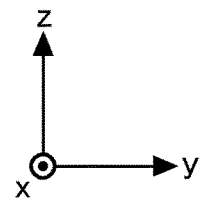

[Example 2] FIG. 9A and FIG. 9B illustrate configurations of an interior of a semiconductor package of a magnetic sensor 100C according to Example 2 of the present embodiment, FIG. 9A being a top view (a plan view in the z axis direction) and FIG. 9B being an A-A line sectional view of FIG. 9A. Regarding reference numerals in the figures, the same reference numerals are given to components having the same function in FIG. 5A and FIG. 5B. The magnetic sensor 100C of Example 2 differs from the magnetic sensor 100A of example 1 in that the die pad 60 has a coupling portion 600, that the fourth frame portion 604 is composed of an eleventh frame portion 611 and a twelfth frame portion 612, that a space portion 72 is provided, that a second gap 77 is provided between the eleventh frame portion 611 and the twelfth frame portion 612.

The die pad 60 includes a first frame portion 601 extending along the x axis direction, a second frame portion 602 extending along the x axis direction, facing the first frame portion 601 in the y axis direction which intersects with the x axis direction, and spaced apart from the first frame portion 601, and a coupling portion 600 extending along the y axis direction and coupling the first frame portion 601 and the second frame portion 602. The coupling portion 600 may be coupled to the central portion of the first frame portion 601 and the central portion of the second frame portion 602. The first frame portion 601, the second frame portion 602, and the coupling portion 600 may form a H shape. The magnetoelectric conversion element 21 having a magnetoelectric conversion unit and the magnetoelectric conversion element 22 having a magnetoelectric conversion unit are arranged facing each other in the x axis direction. The coupling portion 600 is arranged between the magnetoelectric conversion element 21 and the magnetoelectric conversion element 22 in the plan view.

The die pad 60 includes the third frame portion 603 and the fourth frame portion 604 arranged facing each other across the coupling portion 600, which extend along the y axis direction between the first frame portion 601 and the second frame portion 602. The first frame portion 601 includes the fifth frame portion 605 on the third frame portion 603 side with respect to the coupling portion 600 and the sixth frame portion 606 on the fourth frame portion 604 side with respect to the coupling portion 600. The second frame portion 602 includes the seventh frame portion 607 on the third frame portion 603 side with respect to the coupling portion 600 and the eighth frame portion 608 on the fourth frame portion 604 side with respect to the coupling portion 600. The third frame portion 603 has a first gap 76 which reaches to the space portion 71 surrounded by the coupling portion 600, the third frame portion 603, the fifth frame portion 605, and the seventh frame portion 607 from an outer edge. The fourth frame portion 604 has a second gap 77 which reaches to the space portion 72 surrounded by the coupling portion 600, the fourth frame portion 604, the sixth frame portion 606, and the eighth frame portion 608 from an outer edge. The third frame portion 603 includes the ninth frame portion 609 extending along the y axis direction from one end of the first frame portion 601 toward the second frame portion 602, and the tenth frame portion 610 extending along the y axis direction from one end of the second frame portion 602 toward the first frame portion 601, facing the ninth frame portion 609 in the y axis direction, and spaced apart from the ninth frame portion 609. The die pad 60 has the first gap 76 between the ninth frame portion 609 and the tenth frame portion 610. The die pad 60 has the space portion 71 surrounded by the first frame portion 601, the second frame portion 602, the coupling portion 600, the ninth frame portion 609, and the tenth frame portion 610, and connected to the first gap 76. The magnetoelectric conversion element 21 is arranged within the space portion 71 in the plan view. The magnetoelectric conversion element 21 is arranged between the tenth frame portion 610 and the coupling portion 600 in the plan view.

The fourth frame portion 604 includes the eleventh frame portion 611 extending along the y axis direction from the other end of the first frame portion 601 toward the second frame portion 602, and the twelfth frame portion 612 extending along the y axis direction from the other end of the second frame portion 602 toward the first frame portion 601, facing the eleventh frame portion 611 in the y axis direction, and spaced apart from the eleventh frame portion 611. The die pad 60 has the second gap 77 between the eleventh frame portion 611 and the twelfth frame portion 612. The die pad 60 has the space portion 72 surrounded by the first frame portion 601, the second frame portion 602, the coupling portion 600, the eleventh frame portion 611, and the twelfth frame portion 612, and connected to the second gap 77. The magnetoelectric conversion element 22 is arranged within the space portion 72 in the plan view. The magnetoelectric conversion element 22 is arranged between the twelfth frame portion 612 and the coupling portion 600 in the plan view. The space portion 72 is an example of the second space portion.

The signal processing IC 25 is supported by the first frame portion 601, the second frame portion 602, the coupling portion 600, the third frame portion 603, and the fourth frame portion 604. The first frame portion 601 and the ninth frame portion 609, the second frame portion 602 and the tenth frame portion 610, the first frame portion 601 and the eleventh frame portion 611, and the second frame portion 602 and the twelfth frame portion 612 are respectively coupled to each other, each pair forming an L shape. Four corners of the signal processing IC 25 are supported by four L-shaped portions of the die pad 60. The signal processing IC 25 is bonded to the first frame portion 601, the second frame portion 602, the coupling portion 600, the third frame portion 603, and the fourth frame portion 604 of the die pad 60 via the adhesive layer 35. The space portion 71 is provided with the first gap 76 between the ninth frame portion 609 and the tenth frame portion 610 so as not to be closed by the first frame portion 601 and the ninth frame portion 609 forming an L shape, the second frame portion 602 and the tenth frame portion 610 forming an L shape, and the I-shaped coupling portion 600. In addition, the space portion 72 is provided with the second gap 77 between the eleventh frame portion 611 and the twelfth frame portion 612 so as not to be closed by the first frame portion 601 and the eleventh frame portion 611 forming an L shape, the second frame portion 602 and the twelfth frame portion 612 forming an L shape, and the l-shaped coupling portion 600.

The first gap 76 and the second gap 77 may be provided in the first frame portion 601 or the second frame portion 602 so as to be connected to the space portion 71 or the space portion 72. A plurality of the first gaps 76 and the second gaps 77 may be provided, but one gap is desirably provided for one space portion. By doing so, the L-shaped portions of the four corners of the die pad 60 are coupled to be integrally composed, thereby allowing the signal processing IC 25 to be stably bonded thereto without any difference in the flatness level.

Figure 10:
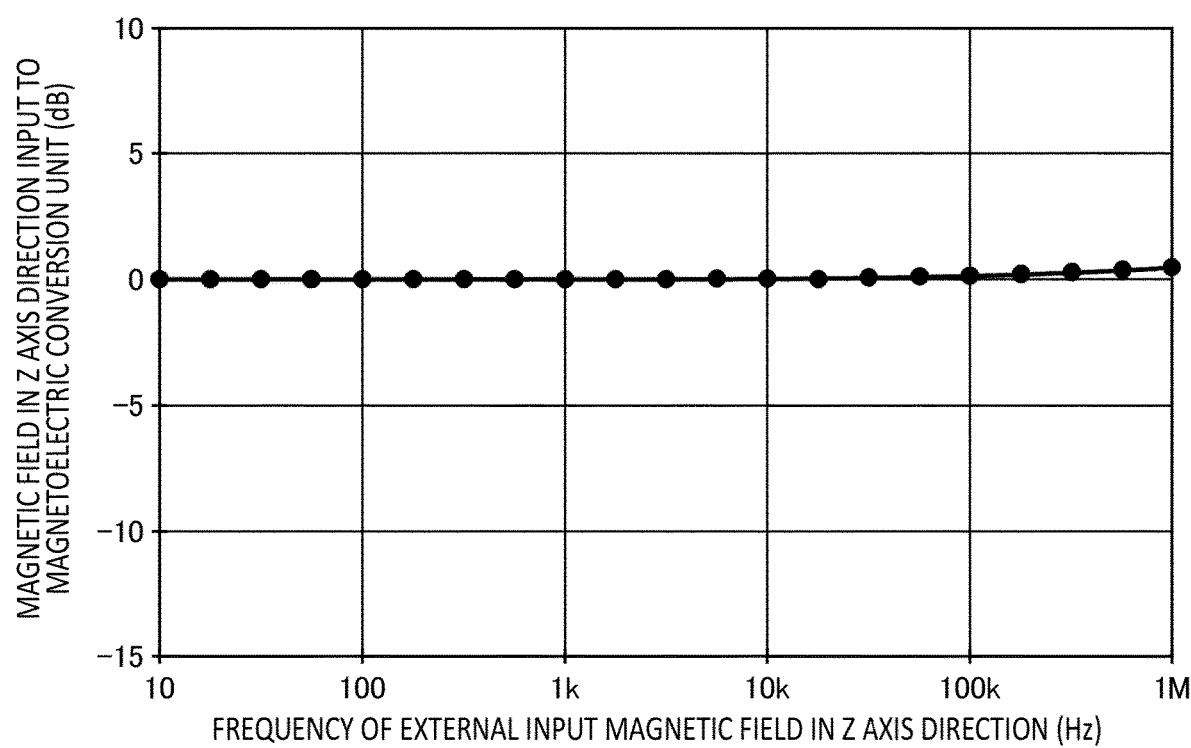
FIG. 10 illustrates a simulation result on the frequency response of a magnetic field in the z axis direction input to the magnetoelectric conversion unit of the magnetoelectric conversion element with respect to an external input magnetic field in the z axis direction of the magnetic sensor in Example 2.

FIG. 10 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100C. As an example, the width of the first frame portion 601, the second frame portion 602, the coupling portion 600, the third frame portion 603, and the fourth frame portion 604 of the die pad 60 illustrated in FIG. 9A and FIG. 9B is 0.5 mm. Other dimensions and parameters are the same as those in FIG. 6.

The magnetic field in the z axis direction input to the magnetoelectric conversion unit of the magnetoelectric conversion element 21 is maintained to be 0 dB up to near 100 kHz of the external input magnetic field in the z axis direction, starts to slightly increase from near 100 kHz, but the increase remains to be approximately 0.6 dB even at 1 MHz. Therefore, the frequency response of the magnetic sensor 100C of Example 2 is significantly improved as compared to the magnetic sensor 100 illustrated in FIG. 1A, and is suitable for applications in which the external input magnetic field changes rapidly. In addition, by selecting suitable widths for the first frame portion 601, the second frame portion 602, the coupling portion 600, the third frame portion 603, and the fourth frame portion 604 of the die pad 60, a magnetic sensor with an excellent frequency response in a higher frequency can be provided.

Figure 11A:
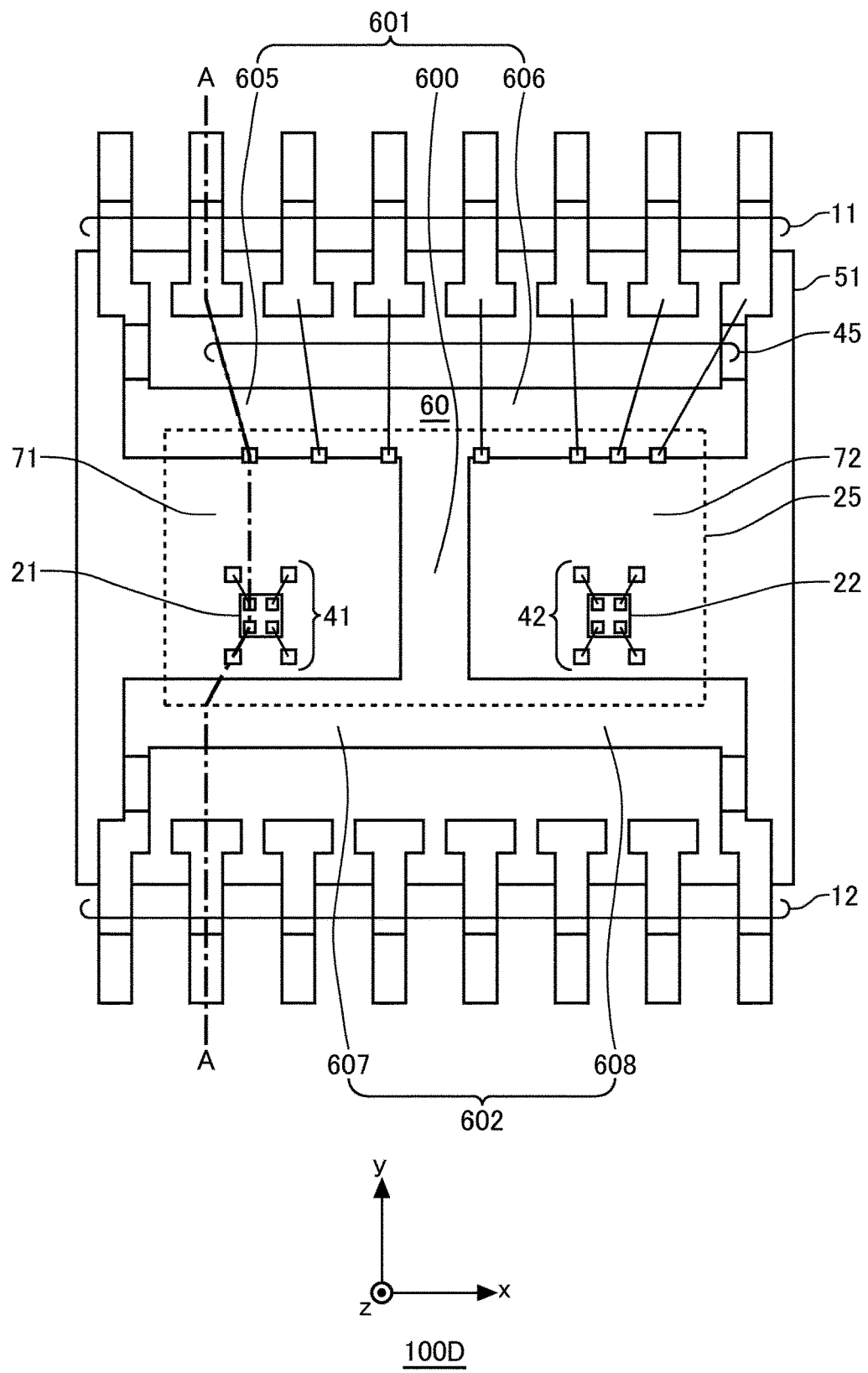
FIG. 11A is a top view of a configuration of an interior of a semiconductor package of a magnetic sensor according to Example 3.
Figure 11B:
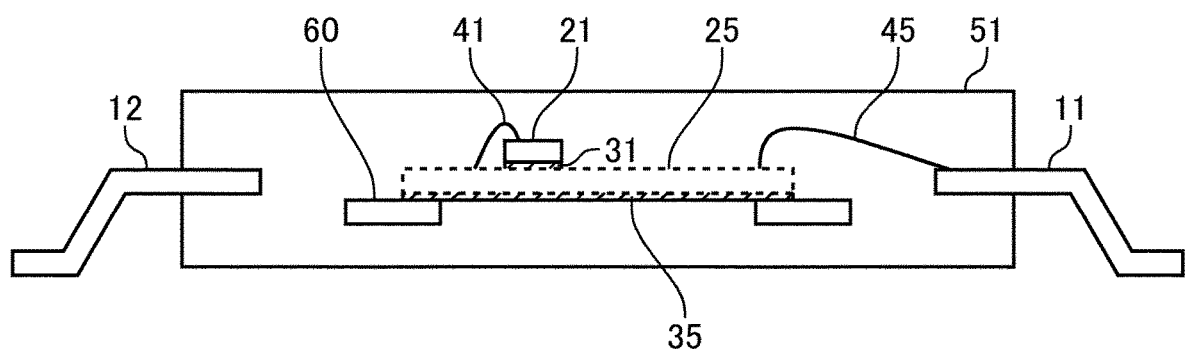
FIG. 11B is an A-A line sectional view of FIG. 11A.
Figure 11B:
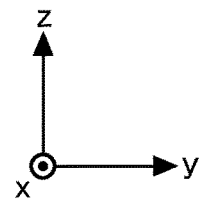

[Example 3] FIG. 11A and FIG. 11B illustrate configurations of an interior of a semiconductor package of a magnetic sensor 100D according to Example 3 of the present embodiment, FIG. 11A being a top view (a plan view in the z axis direction) and FIG. 11B being an A-A line sectional view of FIG. 11A. Regarding reference numerals in the figures, the same reference numerals are given to components having the same function in FIG. 9A and FIG. 9B.

The die pad 60 of the magnetic sensor 100D differs from the magnetic sensor 100C illustrated in FIG. 9A in that it does not have the third frame portion 603 and the fourth frame portion 604. The die pad 60 of the magnetic sensor 100D is formed into an H shape by the first frame portion 601, the second frame portion 602, and the coupling portion 600.

Figure 12:
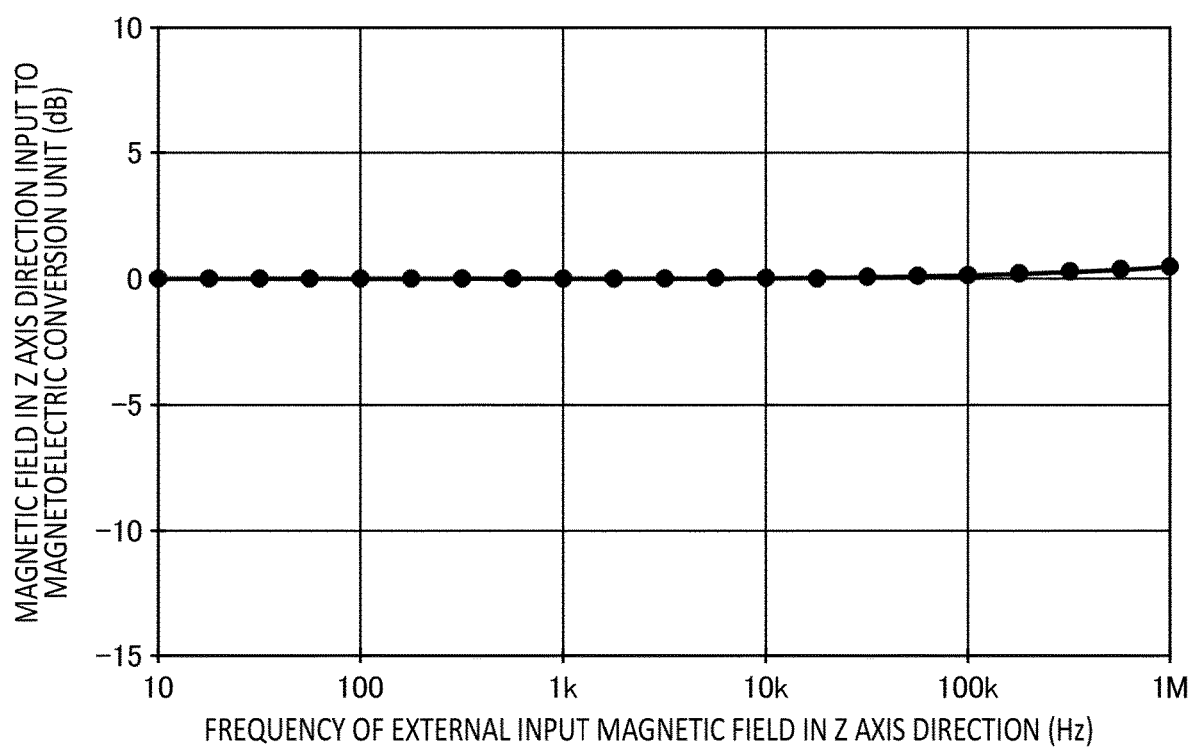
FIG. 12 illustrates a simulation result on the frequency response of a magnetic field in the z axis direction input to the magnetoelectric conversion unit of the magnetoelectric conversion element with respect to an external input magnetic field in the z axis direction of the magnetic sensor in Example 3.

FIG. 12 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100D.

The magnetic field in the z axis direction input to the magnetoelectric conversion unit of the magnetoelectric conversion element 21 is maintained to be 0 dB up to near 100 kHz of the external input magnetic field in the z axis direction, starts to slightly increase from near 100 kHz, but the increase remains to be approximately 0.4 dB even at 1 MHz. Therefore, the frequency response of the magnetic sensor 100D of Example 3 is significantly improved as compared to the magnetic sensor 100 illustrated in FIG. 1A, and is suitable for applications in which the external input magnetic field changes rapidly. In addition, by selecting suitable widths for the first frame portion 601, the second frame portion 602, and the coupling portion 600 of the die pad 60, a magnetic sensor with an excellent frequency response in a higher frequency can be provided.

Figure 13A:
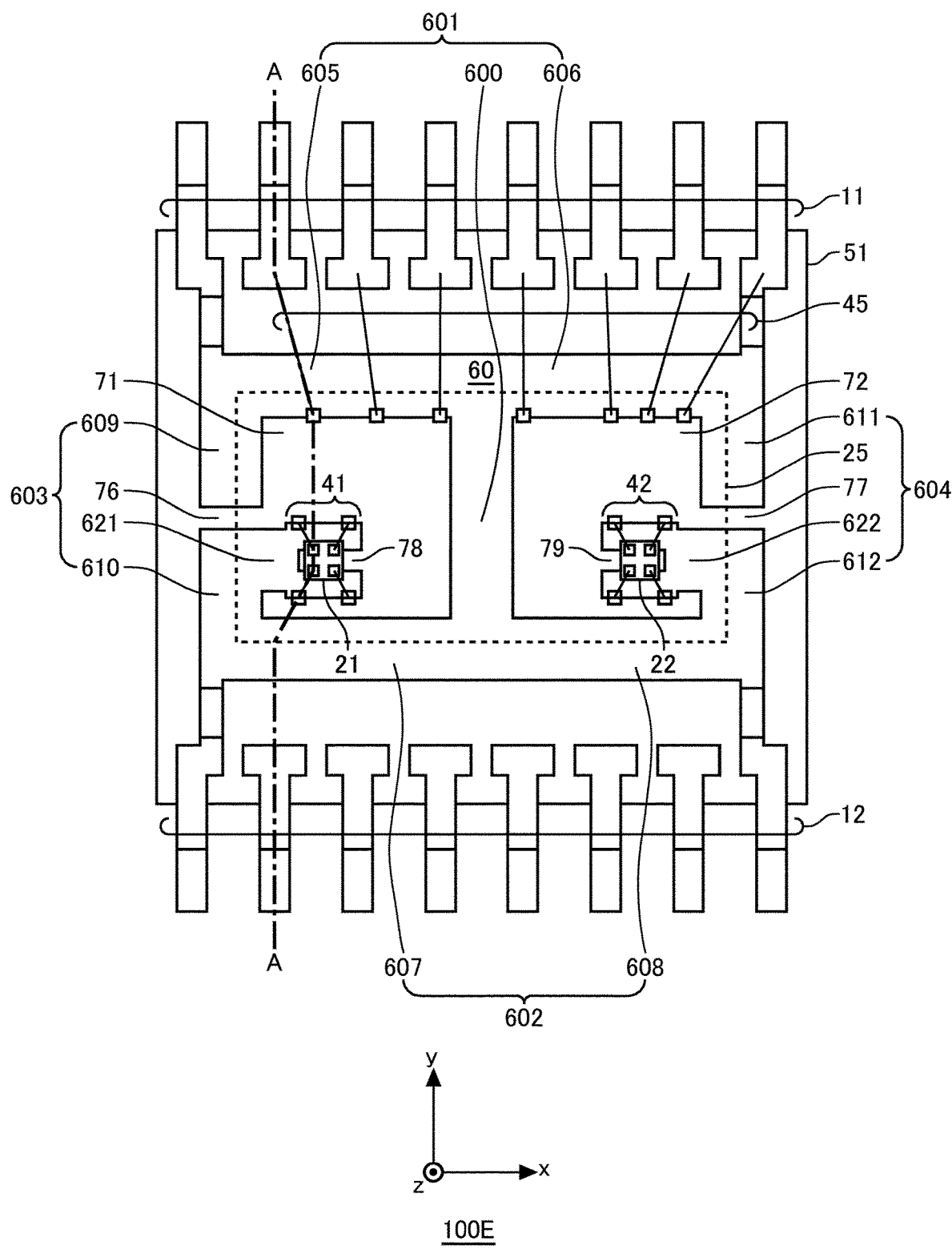
FIG. 13A is a top view of a configuration of an interior of a semiconductor package of a magnetic sensor according to Example 4.
Figure 13B:
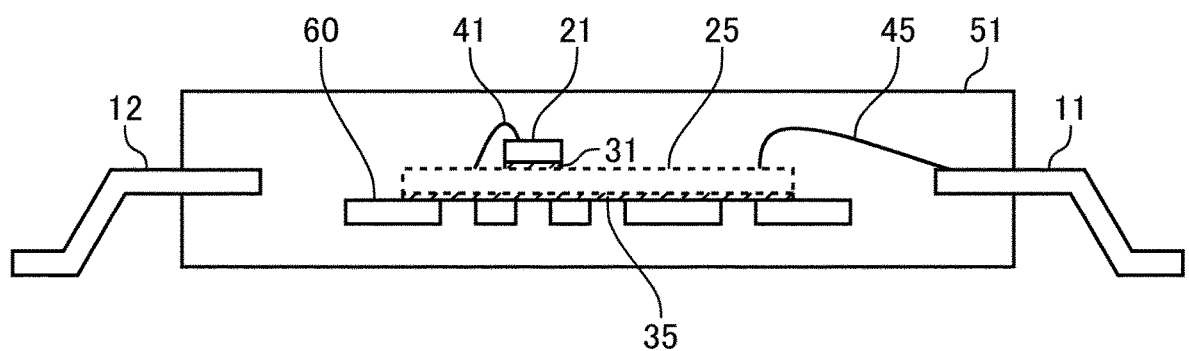
FIG. 13B is an A-A line sectional view of FIG. 13A.
Figure 13B:
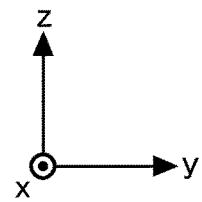

[Example 4] FIG. 13A and FIG. 13B illustrate configurations of an interior of a semiconductor package of a magnetic sensor 100E according to Example 4 of the present embodiment, FIG. 13A being a top view (a plan view in the z axis direction) and FIG. 13B being an A-A line sectional view of FIG. 13A. Regarding reference numerals in the figures, the same reference numerals are given to components having the same function in FIG. 9A and FIG. 9B.

The die pad 60 of the magnetic sensor 100E differs from the die pad 60 of the magnetic sensor 100C in that it includes a first extending portion 621 extending from the third frame portion 603 into the space portion 71 and a second extending portion 622 extending from the fourth frame portion 604 into the space portion 72. The first extending portion 621 extends along the x axis direction from one end of the tenth frame portion 610 facing the ninth frame portion 609 toward the coupling portion 600, and is spaced apart from the coupling portion 600. Further, the second extending portion 622 extends along the x axis direction from one end of the twelfth frame portion 612 facing the eleventh frame portion 611 toward the coupling portion 600, and is spaced apart from the coupling portion 600.

The magnetoelectric conversion element 21 is arranged on the side of a surface on which the signal processing IC 25 at the end of the first extending portion 621 is arranged. The end of the first extending portion 621 has a first slit 78 which at least extends to a position facing the magnetoelectric conversion unit of the magnetoelectric conversion element 21. The first slit 78 extends along the x axis direction. At least a part of a surrounding portion of the magnetoelectric conversion unit of the magnetoelectric conversion element 21 is supported by an outer portion of the first slit 78 of the die pad 60. The first extending portion 621 has a width that is equal to or smaller than a specific width, similar to the first frame portion 601 or the like.

The magnetoelectric conversion element 22 is arranged on the side of a surface on which the signal processing IC 25 at the end of the second extending portion 622 is arranged. The end of the second extending portion 622 has a second slit 79 which at least extends to a position facing the magnetoelectric conversion unit of the magnetoelectric conversion element 22. The second slit 79 extends along the x axis direction. At least a part of a surrounding portion of the magnetoelectric conversion unit of the magnetoelectric conversion element 22 is supported by an outer portion of the second slit 79 of the die pad 60. The second extending portion 622 has a width that is equal to or smaller than a specific width, similar to the first frame portion 601 or the like.

The die pad 60 supports the signal processing IC 25 with the fifth frame portion 605 and the ninth frame portion 609 forming an L shape, the seventh frame portion 607 and the tenth frame portion 610 forming an L shape, the I-shaped coupling portion 600, the sixth frame portion 606 and the eleventh frame portion 611 forming an L shape, the eighth frame portion 608 and the twelfth frame portion 612 forming an L shape, and the first extending portion 621 and the second extending portion 622, in the plan view.

The die pad 60 has the first gap 76 which reaches to the space portion 71 surrounded by the coupling portion 600, the third frame portion 603, the fifth frame portion 605, and the seventh frame portion 607 from an outer edge. The space portion 71 is surrounded by the fifth frame portion 605 and the ninth frame portion 609 forming an L shape, the seventh frame portion 607 and the tenth frame portion 610 forming an L shape, and the l-shaped coupling portion 600, and connected to the first gap 76. The die pad 60 has the second gap 77 which reaches to the space portion 72 surrounded by the coupling portion 600, the fourth frame portion 604, the sixth frame portion 606, and the eighth frame portion 608 from an outer edge. The space portion 72 is surrounded by the sixth frame portion 606 and the eleventh frame portion 611 forming an L shape, the eighth frame portion 608 and the twelfth frame portion 612 forming the L shape, and the I-shaped coupling portion 600, and connected to the second gap 77.

The signal processing IC 25 is bonded to the first frame portion 601, the second frame portion 602, the coupling portion 600, the ninth frame portion 609, the tenth frame portion 610, the eleventh frame portion 611, the twelfth frame portion 612, the first extending portion 621, and the second extending portion 622 of the die pad 60 via the adhesive layer 35. Since parts of the magnetoelectric conversion elements 21 and 22 is arranged to be overlapped with the first extending portion 621 and the second extending portion 622 in the plan view, a base is formed in contact with the second surface on the opposite side of the first surface facing the die pad 60 of the signal processing IC 25, when performing die bonding of the magnetoelectric conversion elements 21 and 22, thereby allowing stable assembly thereof.

The space portions 71 and 72 have polygonal shapes, instead of the rectangular shape of space portions of the magnetic sensor 100A of Example 1 and the magnetic sensor 100C of Example 2, each forming a space portion in one shape.

The first extending portion 621 and the second extending portion 622 are respectively coupled to one end of the tenth frame portion 610 and the twelfth frame portion 612 in Example 4, but it is not limited thereto. The first extending portion 621 may extend from an end side of the fifth frame portion 605, an end side of the seventh frame portion 607, an end side of the ninth frame portion 609, or an end side of the coupling portion 600. Similarly, the second extending portion 622 may extend from an end side of the sixth frame portion 606, an end side of the eighth frame portion 608, an end side of the eleventh frame portion 611, or an end side of the coupling portion 600.

The first slit 78 extends in the x axis direction to a position facing the magnetoelectric conversion unit of the magnetoelectric conversion element 21 at the end of the first extending portion 621 in Example 4, but it is not limited thereto. In addition, the second slit 79 extends in the x axis direction to a position facing the magnetoelectric conversion unit of the magnetoelectric conversion element 22 at the end of the second extending portion 622 in Example 4, but it is not limited thereto. The first slit 78 and the second slit 79 may each extend in the y axis direction.

Figure 14:
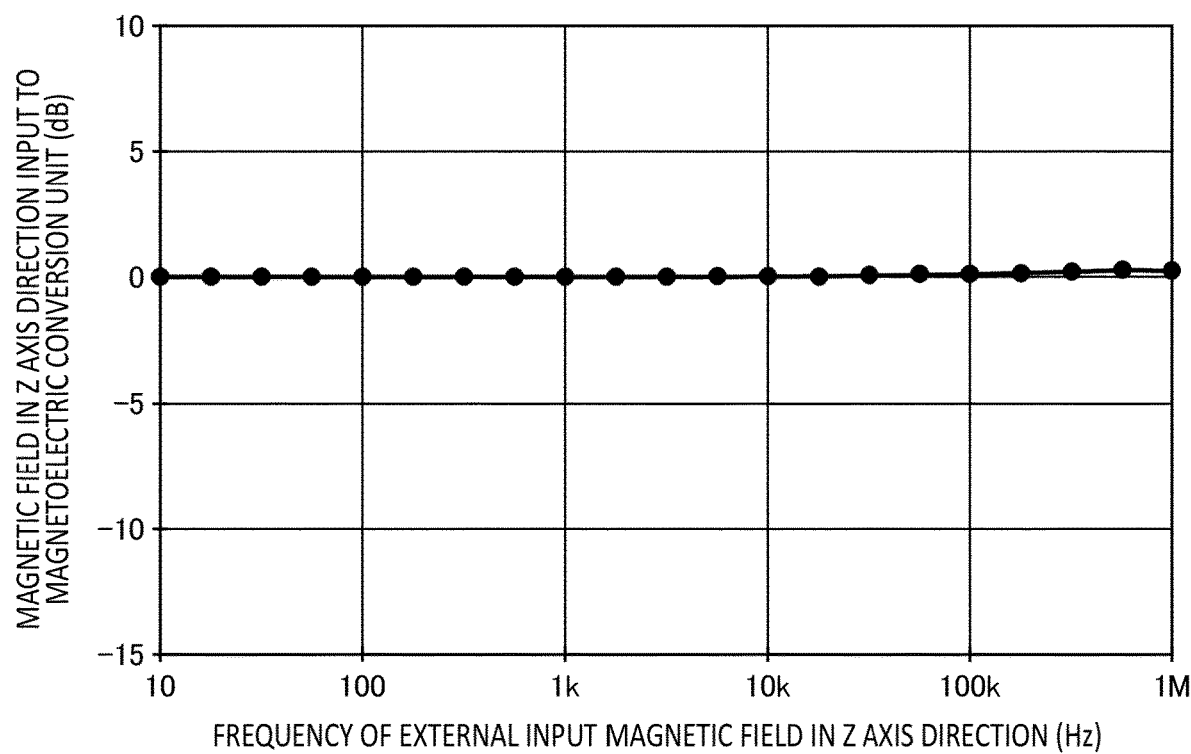
FIG. 14 illustrates a simulation result on the frequency response of a magnetic field in the z axis direction input to the magnetoelectric conversion unit of the magnetoelectric conversion element with respect to an external input magnetic field in the z axis direction of the magnetic sensor in Example 4.

FIG. 14 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100E. As an example, the widths of the first extending portion 621 and the second extending portion 622 of the die pad 60 illustrated in FIG. 13A are as follows: the portion without the first slit 78 and the second slit 79 has a width of 0.5 mm, and the portion including the first slit 78 and the second slit 79 has a width of 0.2 mm. Other dimensions and parameters are the same as those in FIG. 10.

The magnetic field in the z axis direction input to the magnetoelectric conversion unit of the magnetoelectric conversion element 21 is maintained to be 0 dB up to near 100 kHz of the external input magnetic field in the z axis direction, starts to slightly increase from near 100 kHz, but the increase remains to be approximately 0.3 dB even at 1 MHz. Therefore, the frequency response of the magnetic sensor 100E of Example 4 is significantly improved as compared to the magnetic sensor 100 illustrated in FIG. 1A, and is suitable for applications in which the external input magnetic field changes rapidly. In addition, by selecting suitable widths for the first frame portion 601, the second frame portion 602, the coupling portion 600, the ninth frame portion 609, the tenth frame portion 610, the eleventh frame portion 611, the twelfth frame portion 612, the first extending portion 621, and the second extending portion 622 of the die pad 60, a magnetic sensor with an excellent frequency response in a higher frequency can be provided.

Figure 15A:
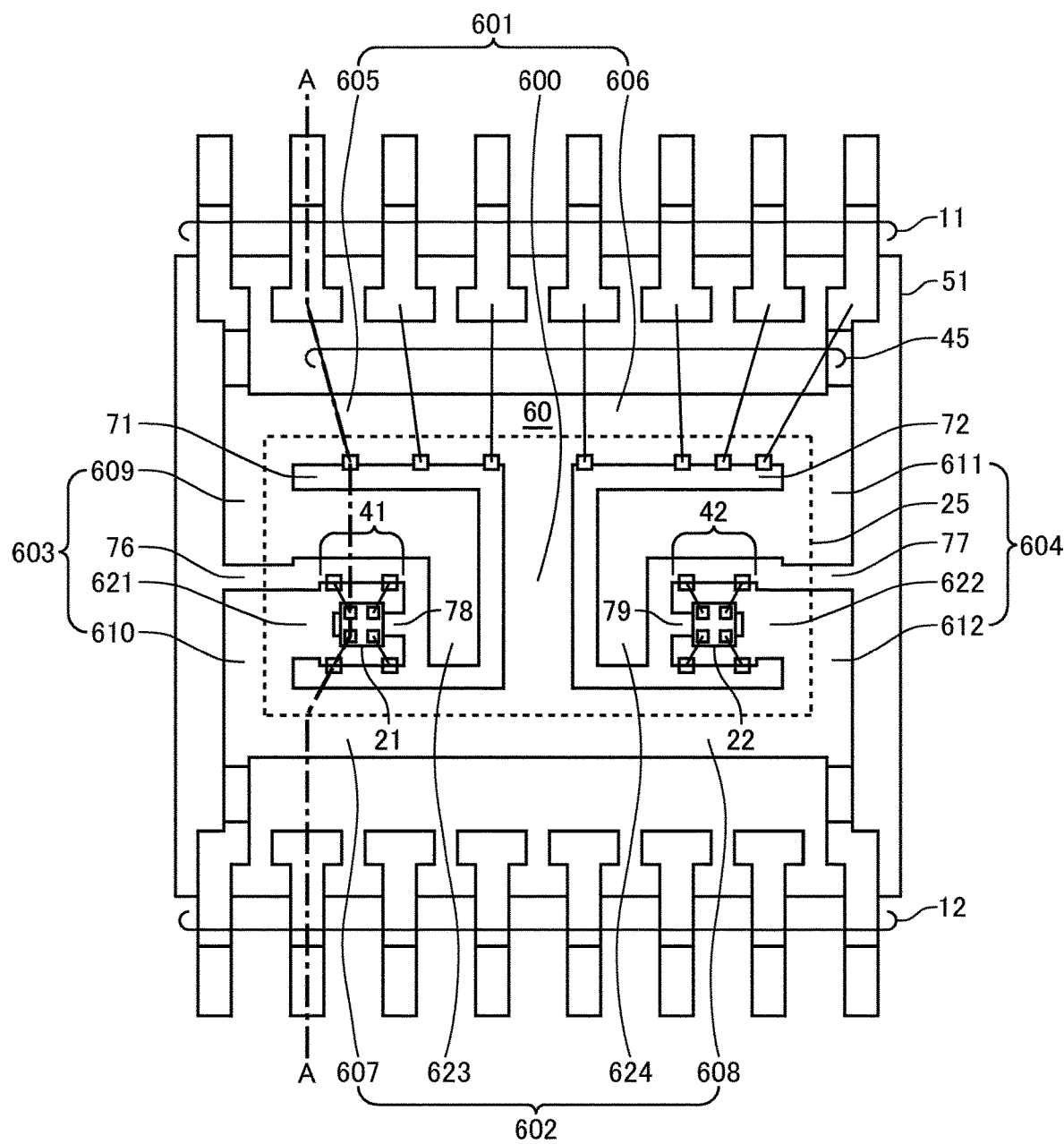
FIG. 15A is a top view of a configuration of an interior of a semiconductor package of a magnetic sensor according to Example 5.
Figure 15B:
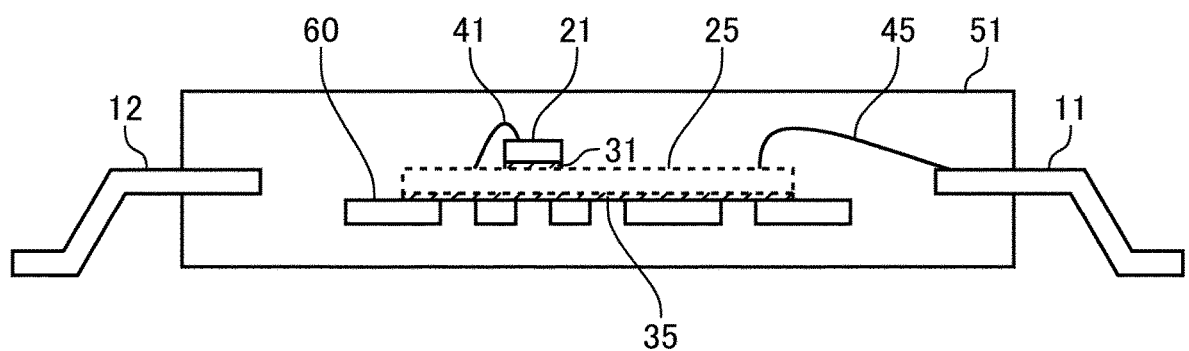
FIG. 15B is an A-A line sectional view of FIG. 15A.
Figure 15B:
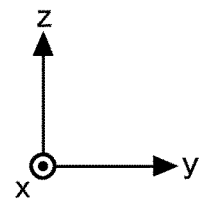

[Example 5] FIG. 15A and FIG. 15B illustrate configurations of an interior of a semiconductor package of a magnetic sensor 100F according to Example 5 of the present embodiment, FIG. 15A being a top view (a plan view in the z axis direction) and FIG. 15B being an A-A line sectional view of FIG. 15A. Regarding reference numerals in the figures, the same reference numerals are given to components having the same function in FIG. 13A and FIG. 13B. The magnetic sensor 100F of Example 5 differs from the magnetic sensor 100E of example 4 in that the die pad 60 has the third extending portion 623 and the fourth extending portion 624.

The third extending portion 623 extends from the third frame portion 603 so as not to overlap with the first extending portion 621 in the plan view within the space portion 71. The third extending portion 623 extends along the x axis direction from one end of the ninth frame portion 609 facing the tenth frame portion 610 toward the coupling portion 600, and further extends along the y axis direction toward the second frame portion 602 to an area between the first extending portion 621 and the coupling portion 600. The third extending portion 623 forms an L shape. The third extending portion 623 is spaced apart from the fifth frame portion 605, the seventh frame portion 607, the first extending portion 621, and the coupling portion 600.

The fourth extending portion 624 extends from the fourth frame portion 604 so as not to overlap with the second extending portion 622 in the plan view within the space portion 72. The fourth extending portion 624 extends along the x axis direction from one end of the eleventh frame portion 611 facing the twelfth frame portion 612 toward the coupling portion 600, and further extends along the y axis direction toward the eighth frame portion 608 to area between the second extending portion 622 and the coupling portion 600. The fourth extending portion 624 forms an L shape. The fourth extending portion 624 is spaced apart from the sixth frame portion 606, the eighth frame portion 608, the second extending portion 622, and the coupling portion 600. The third extending portion 623 and the fourth extending portion 624 extend on the inside of the die pad 60 to reduce the areas of the space portions 71 and 72.

The die pad 60 supports the signal processing IC 25 with the fifth frame portion 605 and the ninth frame portion 609 forming an L shape, the seventh frame portion 607 and the tenth frame portion 610 forming an L shape, the l-shaped coupling portion 600, the sixth frame portion 606 and the eleventh frame portion 611 forming an L shape, the eighth frame portion 608 and the twelfth frame portion 612 forming an L shape, the first extending portion 621, the second extending portion 622, the third extending portion 623 forming an L shape, and the fourth extending portion 624 forming an L shape, in the plan view.

The signal processing IC 25 is bonded to each of the first frame portion 601, the second frame portion 602, the coupling portion 600, the ninth frame portion 609, the tenth frame portion 610, the eleventh frame portion 611, the twelfth frame portion 612, the first extending portion 621, the second extending portion 622, the third extending portion 623, and the fourth extending portion 624 of the die pad 60 via the adhesive layer 35. Since die pad 60 has the third extending portion 623 and the fourth extending portion 624, the space portion of the die pad 60 is reduced and the bonding region between the signal processing IC 25 and the die pad 60 is increased, thereby a base of the signal processing IC 25 can be secured, allowing more stable assembly.

Similarly, the space portions 71 and 72 have polygonal shapes, instead of the rectangular shape of the space portions of the magnetic sensor 100A in Example 1 and the magnetic sensor 100C in Example 2, each forming a space portion in one shape.

The third extending portion 623 and the fourth extending portion 624 are coupled to one end of the ninth frame portion 609 and the eleventh frame portion 611, respectively, in Example 5, but it is not limited thereto. The third extending portion 623 may extend from an end side of the tenth frame portion 610, an end side of the fifth frame portion 605, an end side of the seventh frame portion 607, or an end side of the coupling portion 600. Similarly, the fourth extending portion 624 may extend from an end side of the twelfth frame portion 612, an end side of the sixth frame portion 606, an end side of the eighth frame portion 608, or an end side of the coupling portion 600.

Figure 16:
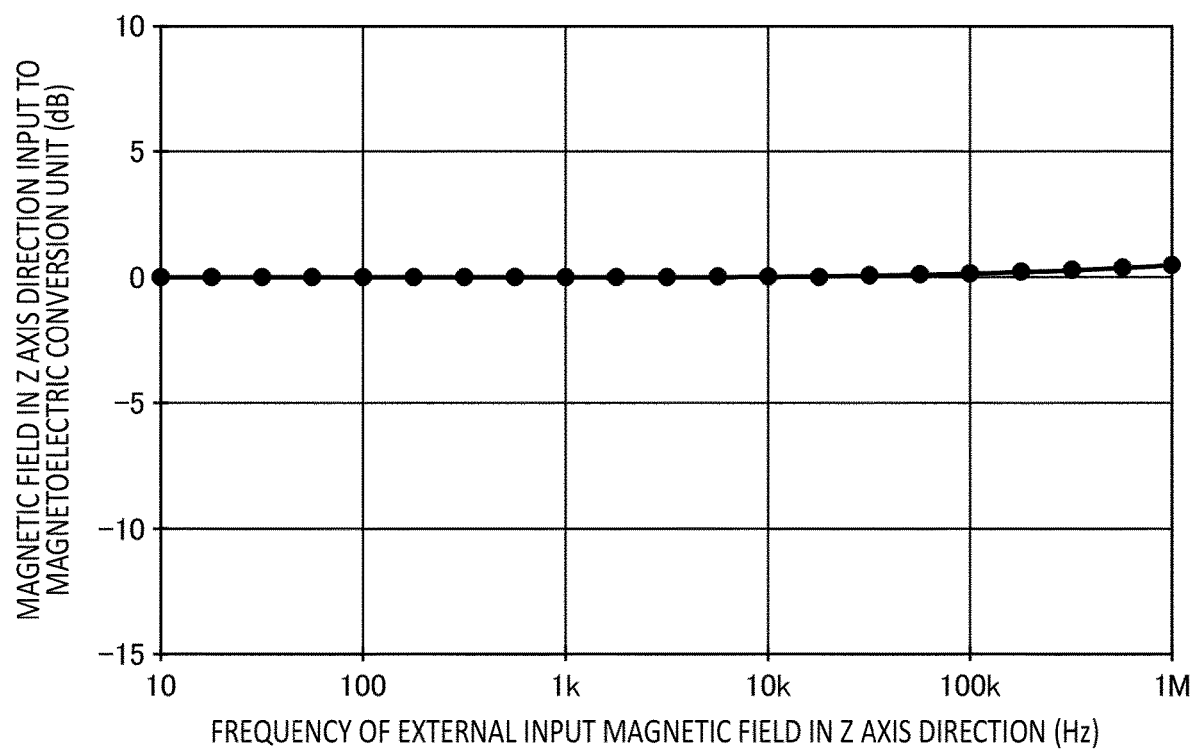
FIG. 16 illustrates a simulation result on the frequency response of a magnetic field in the z axis direction input to the magnetoelectric conversion unit of the magnetoelectric conversion element with respect to an external input magnetic field in the z axis direction of the magnetic sensor in Example 5.

FIG. 16 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100F. As an example, the widths of the third extending portion 623 and the fourth extending portion 624 of the die pad 60 illustrated in FIG. 15A are as follows: the portion extending in the x axis direction has a width of 0.4 mm, and the portion extending in the y axis direction has a width of 0.29 mm. Other dimensions and parameters are the same as those in FIG. 14.

The magnetic field in the z axis direction input to the magnetoelectric conversion unit of the magnetoelectric conversion element 21 is maintained to be 0 dB up to near 100 kHz of the external input magnetic field in the z axis direction, starts to slightly increase from near 100 kHz, but the increase remains to be approximately 0.6 dB even at 1 MHz. Therefore, the frequency response of the magnetic sensor 100F of Example 5 is significantly improved as compared to the magnetic sensor 100 illustrated in FIG. 1A, and is suitable for applications in which the external input magnetic field changes rapidly.

Figure 17A:
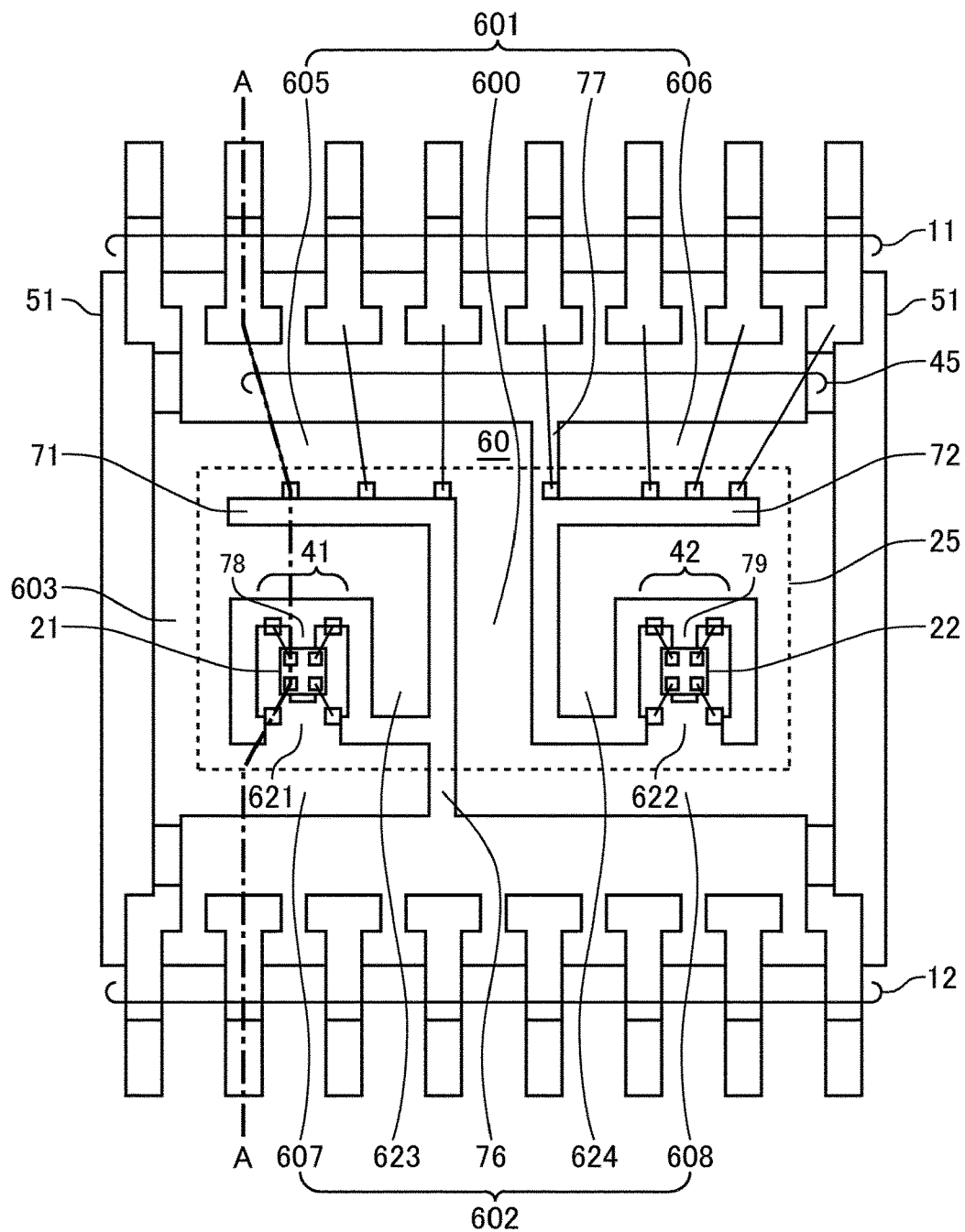
FIG. 17A is a top view of a configuration of an interior of a semiconductor package of a magnetic sensor according to Example 6.
Figure 17B:
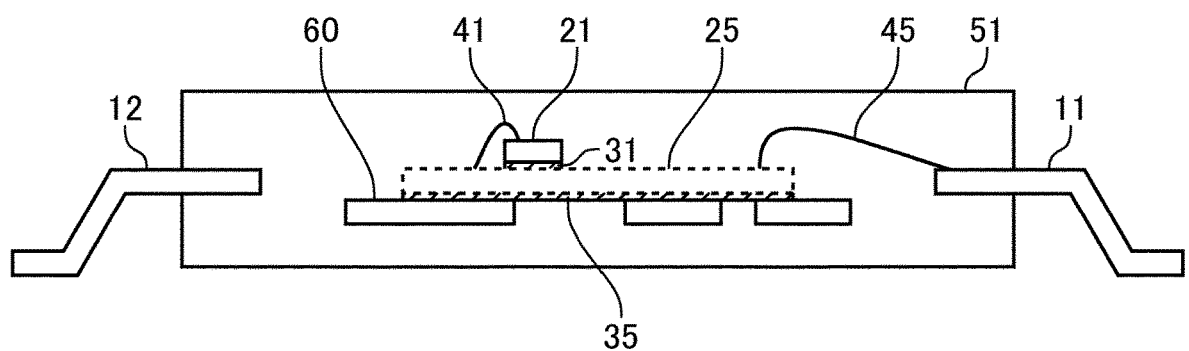
FIG. 17B is an A-A line sectional view of FIG. 17A.
Figure 17B:
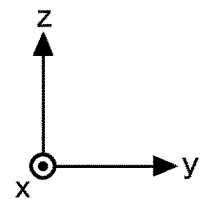

[Example 6] FIG. 17A and FIG. 17B illustrate configurations of an interior of a semiconductor package of a magnetic sensor 100G according to Example 6 of the present embodiment, FIG. 17A being a top view (a plan view in the z axis direction) and FIG. 17B being an A-A line sectional view of FIG. 17A. Regarding reference numerals in the figures, the same reference numerals are given to components having the same function in FIG. 15A and FIG. 15B.

The magnetic sensor 100G of Example 6 differs from the magnetic sensor 100F of Example 5 in that the first gap 76 is provided in the seventh frame portion 607 instead of the third frame portion 603, and that the second gap 77 is provided in the sixth frame portion 606 instead of the fourth frame portion 604. Further, the magnetic sensor 100G of Example 6 differs from the magnetic sensor 100F of Example 5 in that the first extending portion 621 extends along the y axis direction from the seventh frame portion 607 toward the fifth frame portion 605, and that the second extending portion 622 extends along the y axis direction from the eighth frame portion 608 toward the sixth frame portion 606.

The seventh frame portion 607 has a first gap 76 which extends in the y axis direction from an outer edge of the seventh frame portion 607 and reaches to the space portion 71 surrounded by the coupling portion 600, the fifth frame portion 605, the third frame portion 603, and the seventh frame portion 607. The sixth frame portion 606 has a second gap 77 which extends in the y axis direction from an outer edge of the sixth frame portion 606 and reaches to the space portion 72 surrounded by the coupling portion 600, the eighth frame portion 608, the fourth frame portion 604, and the sixth frame portion 606.

The first extending portion 621 is spaced apart from the fifth frame portion 605 and the third extending portion 623. The second extending portion 622 is spaced apart from the sixth frame portion 606 and the fourth extending portion 624. The third extending portion 623 is spaced apart from the fifth frame portion 605, the seventh frame portion 607, the first extending portion 621, and the coupling portion 600. The fourth extending portion 624 is spaced apart from the sixth frame portion 606, the eighth frame portion 608, the second extending portion 622, and the coupling portion 600. The third extending portion 623 and the fourth extending portion 624 extend on the inside of the die pad 60 to reduce the areas of the space portions 71 and 72.

The die pad 60 supports the signal processing IC 25 with the seventh frame portion 607, the third frame portion 603, the fifth frame portion 605, the coupling portion 600, the eighth frame portion 608, the fourth frame portion 604, and the sixth frame portion 606 forming an S shape, the first extending portion 621, the second extending portion 622, the third extending portion 623, and the fourth extending portion 624, in the plan view.

The signal processing IC 25 is bonded to each of the seventh frame portion 607, the third frame portion 603, the fifth frame portion 605, the coupling portion 600, the eighth frame portion 608, the fourth frame portion 604, the sixth frame portion 606, the first extending portion 621, the second extending portion 622, the third extending portion 623, and the fourth extending portion 624 of the die pad 60 via the adhesive layer 35. In this manner, a base of the signal processing IC 25 can be secured, allowing more stable assembly thereof.

Figure 18:
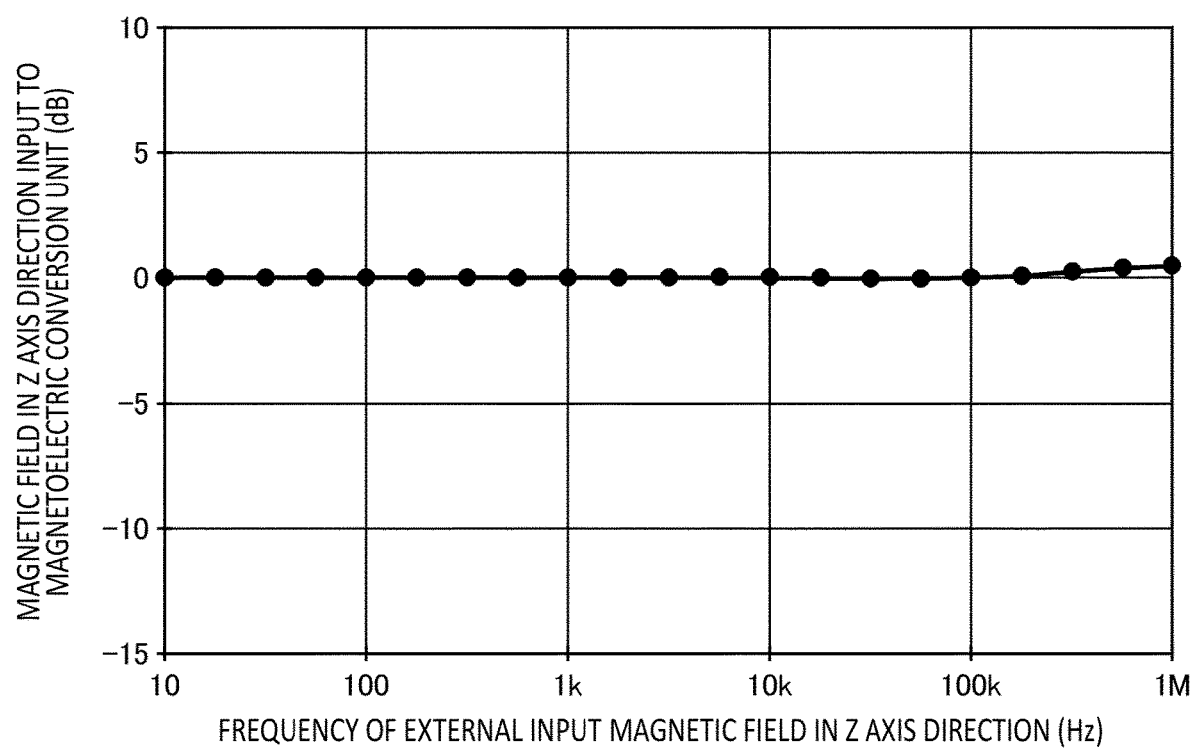
FIG. 18 illustrates a simulation result on the frequency response of a magnetic field in the z axis direction input to the magnetoelectric conversion unit of the magnetoelectric conversion element with respect to an external input magnetic field in the z axis direction of the magnetic sensor in Example 6.

FIG. 18 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100G. As an example, the dimensions and parameters are the same as those in FIG. 16.

The magnetic field in the z axis direction input to the magnetoelectric conversion unit of the magnetoelectric conversion element 21 is maintained to be 0 dB up to near 100 kHz of the external input magnetic field in the z axis direction, starts to slightly increase from near 100 kHz, but the increase remains to be approximately 0.6 dB even at 1 MHZ. Therefore, the frequency response of the magnetic sensor 100G of Example 6 is significantly improved as compared to the magnetic sensor 100 illustrated in FIG. 1A, and is suitable for applications in which the external input magnetic field changes rapidly.

Figure 19A:
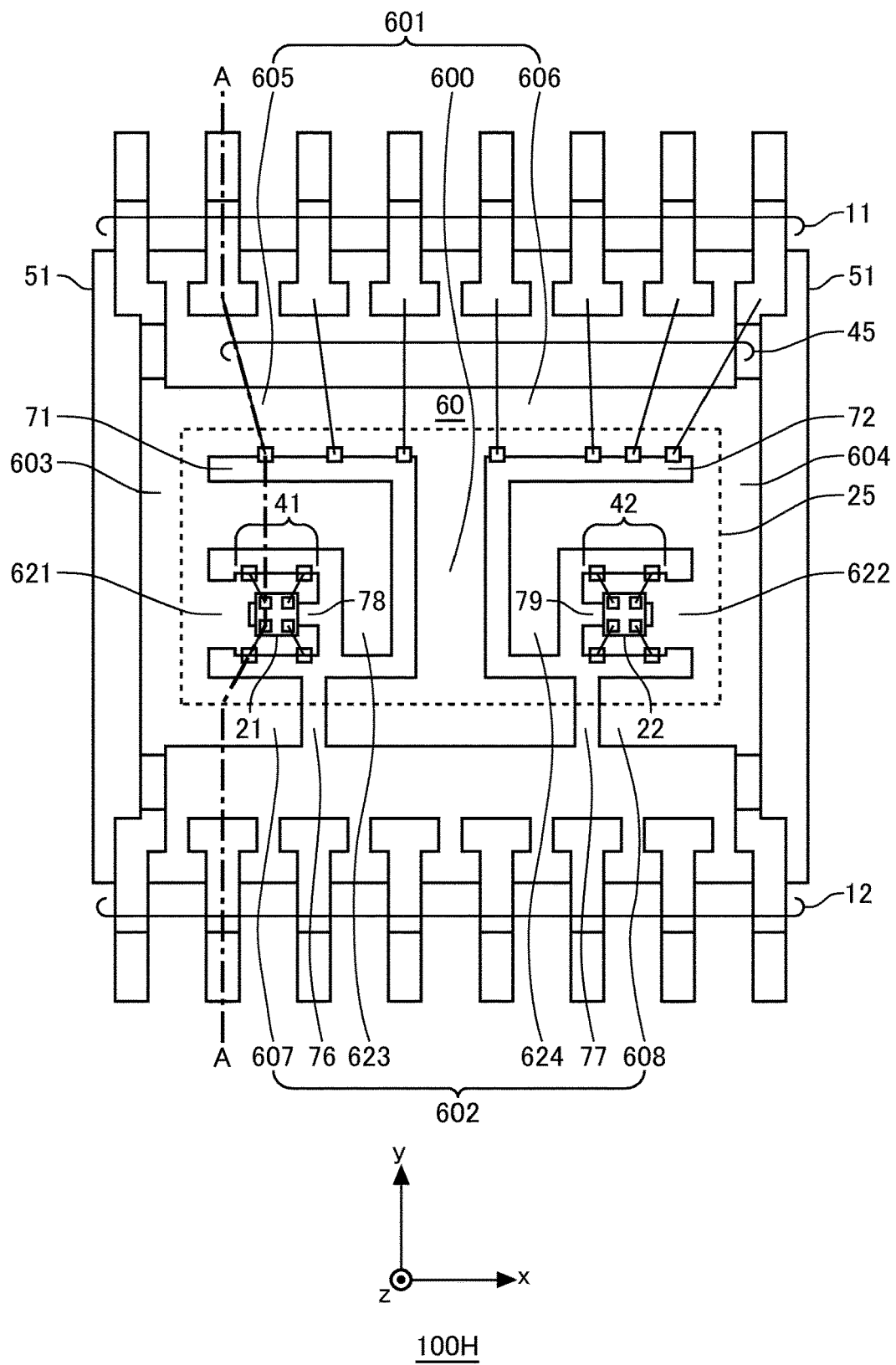
FIG. 19A is a top view of a configuration of an interior of a semiconductor package of a magnetic sensor according to Example 7.
Figure 19B:
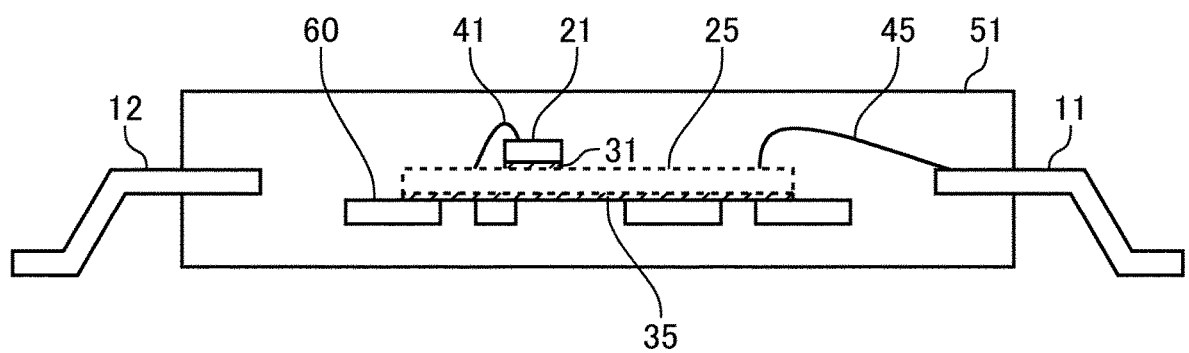
FIG. 19B is an A-A line sectional view of FIG. 19A.
Figure 19B:
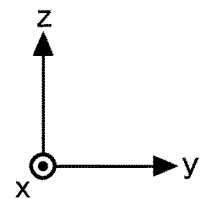

[Example 7] FIG. 19A and FIG. 19B illustrate configurations of an interior of a semiconductor package of a magnetic sensor 100H according to Example 7 of the present embodiment, FIG. 19A being a top view (a plan view in the z axis direction) and FIG. 19B being an A-A line sectional view of FIG. 19A. Regarding reference numerals in the figures, the same reference numerals are given to components having the same function in FIG. 15A and FIG. 15B. The magnetic sensor 100H of Example 7 differs from the magnetic sensor 100F of Example 5 in that the first gap 76 is provided in the seventh frame portion 607 instead of the third frame portion 603, and that the second gap 77 is provided in the eighth frame portion 608 instead of the fourth frame portion 604.

The seventh frame portion 607 has a first gap 76 which extends in the y axis direction from an outer edge of the seventh frame portion 607 and reaches to the space portion 71 surrounded by the coupling portion 600, the fifth frame portion 605, the third frame portion 603, and the seventh frame portion 607. The eighth frame portion 608 has a second gap 77 which extends in the y axis direction from an outer edge of the eighth frame portion 608 and reaches to the space portion 72 surrounded by the coupling portion 600, the sixth frame portion 606, the fourth frame portion 604, and the eighth frame portion 608.

The first extending portion 621 is spaced apart from the seventh frame portion 607 and the third extending portion 623. The second extending portion 622 is spaced apart from the eighth frame portion 608 and the fourth extending portion 624. The third extending portion 623 is spaced apart from the fifth frame portion 605, the seventh frame portion 607, the first extending portion 621, and the coupling portion 600. The fourth extending portion 624 is spaced apart from the sixth frame portion 606, the eighth frame portion 608, the second extending portion 622, and the coupling portion 600. The third extending portion 623 and the fourth extending portion 624 extend on the inside of the die pad 60 to reduce the areas of the space portions 71 and 72.

The die pad 60 supports the signal processing IC 25 with the first frame portion 601 including the fifth frame portion 605 and the sixth frame portion 606, the second frame portion 602 including the seventh frame portion 607 and the eighth frame portion 608, the third frame portion 603, the fourth frame portion 604, the first extending portion 621, the second extending portion 622, the third extending portion 623, and the fourth extending portion 624.

The signal processing IC 25 is bonded to each of the first frame portion 601, the second frame portion 602, the third frame portion 603, the fourth frame portion 604, the first extending portion 621, the second extending portion 622, the third extending portion 623, and the fourth extending portion 624 of the die pad 60 via the adhesive layer 35. In this manner, a base of the signal processing IC 25 can be secured, allowing more stable assembly thereof.

Figure 20:
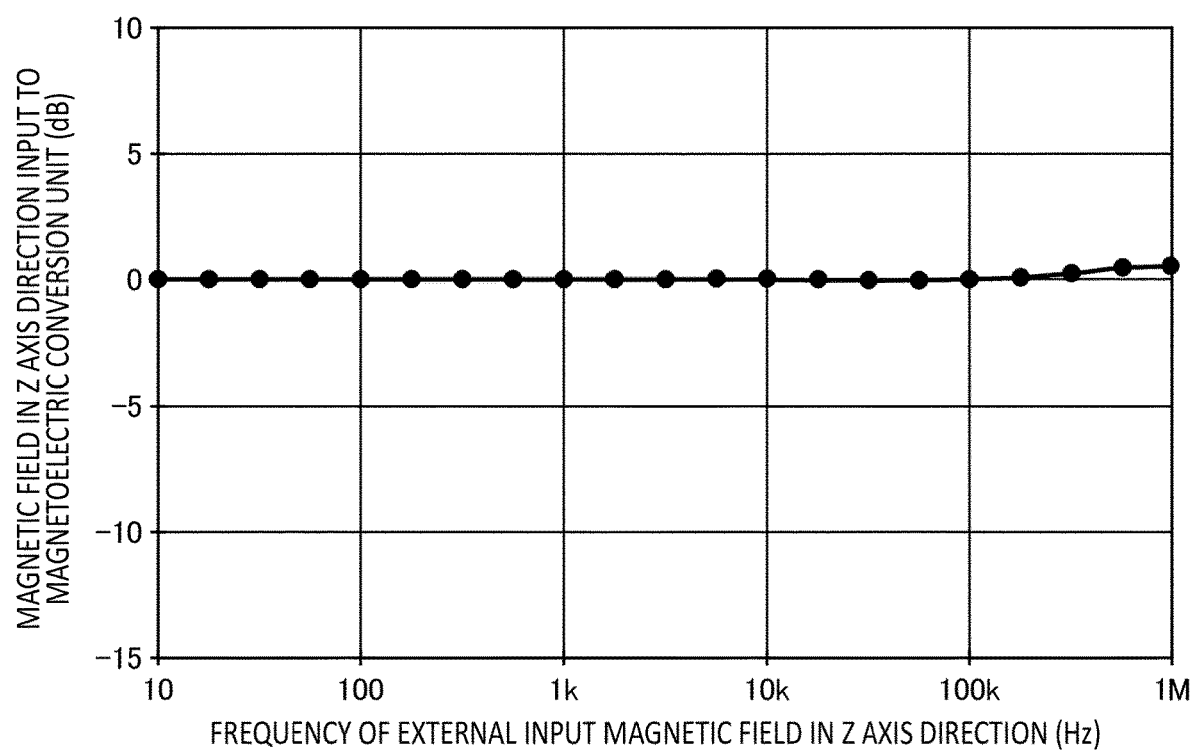
FIG. 20 illustrates a simulation result on the frequency response of a magnetic field in the z axis direction input to the magnetoelectric conversion unit of the magnetoelectric conversion element with respect to an external input magnetic field in the z axis direction of the magnetic sensor in Example 7.

FIG. 20 illustrates a simulation result on the frequency response of a magnetic field in the z axis direction input to the magnetoelectric conversion unit of the magnetoelectric conversion element 21 with respect to an external input magnetic field in the z axis direction of the magnetic sensor 100H. As an example, the dimensions and parameters are the same as those in FIG. 16.

The magnetic field in the z axis direction input to the magnetoelectric conversion unit of the magnetoelectric conversion element 21 is maintained to be 0 dB up to near 100 kHz of the external input magnetic field in the z axis direction, starts to slightly increase from near 100 kHz, but the increase remains to be approximately 0.6 dB even at 1 MHZ. Therefore, the frequency response of the magnetic sensor 100H of Example 7 is significantly improved as compared to the magnetic sensor 100 illustrated in FIG. 1A, and is suitable for applications in which the external input magnetic field changes rapidly.

For the magnetic sensors 100A, 100C, 100D, 100E, 100F, 100G, and 100H of Examples 1 to 7, examples have been illustrated in which the signal processing circuit inputs the output signals of the magnetoelectric conversion elements 21 and 22 and calculates the sum of respective output signals, but the difference of respective output signals may be calculated. In addition, in the magnetic sensors 100A, 100C, 100D, 100E, 100F, 100G, and 100H of Examples 1 to 7, examples have been illustrated in which the magnetoelectric conversion elements 21 and 22 each having the magnetoelectric conversion unit are mounted on the second surface opposite to the first surface facing the die pad 60 of the signal processing IC, but the magnetoelectric conversion unit may be provided on the second surface of the signal processing IC. That is, the magnetoelectric conversion unit may be incorporated in the interior of the signal processing IC and configured as one semiconductor package. In addition, by selecting suitable widths for the first frame portion 601, the second frame portion 602, the coupling portion 600, the third frame portion 603, the fourth frame portion 604, the first extending portion 621, the second extending portion 622, the third extending portion 623, and the fourth extending portion 624 of the die pad 60, a magnetic sensor with an excellent frequency response in a higher frequency can be provided. The first frame portion 601, the second frame portion 602, the third frame portion 603, the fourth frame portion 604, the coupling portion 600, the first extending portion 621, the second extending portion 622, the third extending portion 623, and the fourth extending portion 624 each have a width that is equal to or smaller than a specific width, but may not have the same width. The magnetoelectric conversion elements 21 and 22 may be magneto-resistance elements or flux gate elements, when a magnetic field in one axis direction on the xy plane is to be detected. The magnetic sensors 100A, 100C, 100D, 100E, 100F, 100G, and 100H of Examples 1 to 7 may function as current sensors which are provided near a conductor through which a current to be measured flows, and which detect a magnitude of the magnetic field according to a magnitude of the current to be measured.

While the present invention has been described with the embodiments, the technical scope of the present invention is not limited to the above-described embodiments. It is apparent to persons skilled in the art that various alterations and improvements can be added to the above-described embodiments. It is also apparent from description of the claims that the embodiments to which such alterations or improvements are made can be included in the technical scope of the present invention.

It should be noted that the operations, procedures, steps, stages, and the like of each process performed by an apparatus, system, program, and method shown in the claims, embodiments, or diagrams can be realized in any order as long as the order is not indicated by "prior to," "before," or the like and as long as the output from a previous process is not used in a later process. Even if the operation flow is described using phrases such as "first" or "next" for the sake of convenience in the claims, specification, or drawings, it does not necessarily mean that the process must be performed in this order.

(Item 1)

A magnetic sensor comprising:
a die pad; and
a first magnetoelectric conversion unit which detects a magnetic field and converts it to an electrical signal, a second magnetoelectric conversion unit which detects a magnetic field and converts it to an electrical signal, and a signal processing unit which processes signals output from the first magnetoelectric conversion unit and the second magnetoelectric conversion unit, which are provided on a first face side of the die pad;
wherein the die pad includes:
a first frame portion extending along a first direction;
a second frame portion extending along the first direction and facing the first frame portion in a second direction which intersects with the first direction, and spaced apart from the first frame portion;
a coupling portion extending along the second direction and coupling the first frame portion and the second frame portion; and
a third frame portion and a fourth frame portion extending along the second direction between the first frame portion and the second frame portion and arranged facing each other across the coupling portion, and
wherein the first magnetoelectric conversion unit and the second magnetoelectric conversion unit are arranged facing each other in the first direction across the coupling portion between the third frame portion and the fourth frame portion in a plan view,
the first frame portion includes a fifth frame portion on the third frame portion side relative to the coupling portion and a sixth frame portion on the fourth frame portion side relative to the coupling portion,
the second frame portion includes a seventh frame portion on the third frame portion side relative to the coupling portion and an eighth frame portion on the fourth frame portion side relative to the coupling portion,
at least one of the third frame portion, the fifth frame portion, or the seventh frame portion has a first gap which reaches to a first space portion surrounded by the coupling portion, the third frame portion, the fifth frame portion, and the seventh frame portion from an outer edge, and
at least one of the fourth frame portion, the sixth frame portion, or the eighth frame portion has a second gap which reaches to a second space portion surrounded by the coupling portion, the fourth frame portion, the sixth frame portion, and the eighth frame portion from an outer edge.

(Item 2)

The magnetic sensor according to item 1, wherein the signal processing unit is supported by the first frame portion, the second frame portion, and the coupling portion.

(Item 3)

The magnetic sensor according to item 1, wherein the third frame portion has the first gap extending in the first direction, and the fourth frame portion has the second gap extending in the first direction.

(Item 4)

The magnetic sensor according to item 1, wherein
one of the fifth frame portion or the seventh frame portion has the first gap extending in the second direction, and one of the sixth frame portion or the eighth frame portion has the second gap extending in the second direction.

(Item 5)

The magnetic sensor according to item 1, wherein
the die pad further includes a first extending portion extending from the third frame portion, the fifth frame portion, the seventh frame portion, or the coupling portion into the first space portion, and
the first magnetoelectric conversion unit is arranged on the first face side at an end of the first extending portion.

(Item 6)

The magnetic sensor according to item 5, wherein the first extending portion extends from the third frame portion toward the coupling portion along the first direction, and is spaced apart from the coupling portion.

(Item 7)

The magnetic sensor according to item 5, wherein the first extending portion extends from the fifth frame portion toward the seventh frame portion along the second direction and is spaced apart from the seventh frame portion, or alternatively, extends from the seventh frame portion toward the fifth frame portion along the second direction and is spaced apart from the fifth frame portion.

(Item 8)

The magnetic sensor according to item 5, wherein the end of the first extending portion has a first slit which at least extends to a position facing the first magnetoelectric conversion unit.

(Item 9)

The magnetic sensor according to item 6, wherein
the end of the first extending portion has a first slit which at least extends to a position facing the first magnetoelectric conversion unit, and
the first slit extends along the first direction.

(Item 10)

The magnetic sensor according to item 7, wherein
the end of the first extending portion has a first slit which at least extends to a position facing the first magnetoelectric conversion unit, and
the first slit extends along the second direction.

(Item 11)

The magnetic sensor according to item 8, comprising first magnetoelectric conversion element, wherein
the first magnetoelectric conversion element has the first magnetoelectric conversion unit, and
at least part of a surrounding portion of the first magnetoelectric conversion unit of the first magnetoelectric conversion element is supported by an outer portion of the first slit of the die pad.

(Item 12)

The magnetic sensor according to item 11, wherein
the die pad further includes a second extending portion extending from the fourth frame portion, the sixth frame portion, the eighth frame portion, or the coupling portion into the second space portion, and
the second magnetoelectric conversion unit is arranged on the first face side at an end of the second extending portion.

(Item 13)

The magnetic sensor according to item 12, wherein the second extending portion extends from the fourth frame portion toward the coupling portion along the first direction, and is spaced apart from the coupling portion.

(Item 14)

The magnetic sensor according to item 12, wherein the second extending portion extends from the sixth frame portion toward the eighth frame portion along the second direction and is spaced apart from the eighth frame portion, or alternatively, extends from the eighth frame portion toward the sixth frame portion along the second direction and is spaced apart from the sixth frame portion.

(Item 15)

The magnetic sensor according to item 12, wherein the end of the second extending portion has a second slit which at least extends to a position facing the second magnetoelectric conversion unit.

(Item 16)

The magnetic sensor according to item 13, wherein
the end of the second extending portion has a second slit which at least extends to a position facing the second magnetoelectric conversion unit, and
the second slit extends along the first direction.

(Item 17)

The magnetic sensor according to item 14, wherein
the end of the second extending portion has a second slit which at least extends to a position facing the second magnetoelectric conversion unit, and
the second slit extends along the second direction.

(Item 18)

The magnetic sensor according to item 15, comprising a second magnetoelectric conversion element, wherein
the second magnetoelectric conversion element has the second magnetoelectric conversion unit, and
a surrounding portion of the second magnetoelectric conversion unit of the second magnetoelectric conversion element is supported by an outer portion of the second slit of the die pad.

(Item 19)

The magnetic sensor according to item 18, comprising a signal processing IC, wherein
the signal processing IC has the signal processing unit, and
the first magnetoelectric conversion element and the second magnetoelectric conversion element are arranged on a surface on an opposite side of a surface facing the die pad of the signal processing IC.

(Item 20)

The magnetic sensor according to item 19, wherein the first magnetoelectric conversion element and the second magnetoelectric conversion element are Hall elements.

(Item 21)

The magnetic sensor according to item 19, further comprising an encapsulating portion which encapsulates the signal processing IC, the first magnetoelectric conversion element, and the second magnetoelectric conversion element with mold resin.

(Item 22)

The magnetic sensor according to item 15, wherein
the die pad further includes a third extending portion which extends from the third frame portion, the fifth frame portion, the seventh frame portion, or the coupling portion into the first space portion so as not to overlap with the first extending portion in a plan view.

(Item 23)

The magnetic sensor according to item 15, wherein
the die pad further includes a third extending portion extending from the third frame portion toward the coupling portion along the first direction, and further extending toward the seventh frame portion along the second direction to an area between the first extending portion and the coupling portion, and
the third extending portion is spaced apart from the fifth frame portion, the seventh frame portion, the first extending portion, and the coupling portion.

(Item 24)

The magnetic sensor according to item 15, wherein
the die pad further includes a third extending portion extending from the fifth frame portion or the seventh frame portion toward the seventh frame portion or the fifth frame portion along the second direction, and further extending toward the third frame portion along the first direction, and
the third extending portion is spaced apart from the seventh frame portion or the fifth frame portion, the first extending portion, and the coupling portion.

(Item 25)

The magnetic sensor according to item 22, wherein
the die pad further includes a fourth extending portion extending from the fourth frame portion, the sixth frame portion, the eighth frame portion, or the coupling portion into the second space portion so as not to overlap with the second extending portion in a plan view.

(Item 26)

The magnetic sensor according to item 23, wherein
the die pad further includes a fourth extending portion extending from the fourth frame portion toward the coupling portion along the first direction, and further extending toward the eighth frame portion along the second direction to an area between the second extending portion and the coupling portion, and
the fourth extending portion is spaced apart from the sixth frame portion, the eighth frame portion, the second extending portion, and the coupling portion.

(Item 27)

The magnetic sensor according to item 24, wherein
the die pad further includes a fourth extending portion extending from the sixth frame portion or the eighth frame portion toward the eighth frame portion or the sixth frame portion along the second direction, and further extending toward the fourth frame portion along the first direction, and
the fourth extending portion is spaced apart from the eighth frame portion or the sixth frame portion, the second extending portion, and the coupling portion.

(Item 28)

A magnetic sensor comprising:
a die pad;
a first magnetoelectric conversion element having a first magnetoelectric conversion unit which detects a magnetic field and converts it to an electrical signal, the first magnetoelectric conversion element being provided on a first face side of the die pad;
a second magnetoelectric conversion element having a second magnetoelectric conversion unit which detects a magnetic field and converts it to an electrical signal, the second magnetoelectric conversion element being provided on the first face side of the die pad; and
a signal processing unit which processes signals output from the first magnetoelectric conversion unit and the second magnetoelectric conversion unit,
wherein the die pad has:
a first slit which at least extends to a position facing the first magnetoelectric conversion unit; and
a second slit which at least extends to a position facing the second magnetoelectric conversion unit, wherein a surrounding portion of the first magnetoelectric conversion unit of the first magnetoelectric conversion element is supported by an outer portion of the first slit of the die pad, and a surrounding portion of the second magnetoelectric conversion unit of the second magnetoelectric conversion element is supported by an outer portion of the second slit of the die pad.

(Item 29)

The magnetic sensor according to item 28, wherein the die pad includes:

a first frame portion extending along a first direction;

a second frame portion extending along the first direction and facing the first frame portion in a second direction which intersects with the first direction, and spaced apart from the first frame portion;

a coupling portion extending along the second direction and coupling the first frame portion and the second frame portion; and a third frame portion and a fourth frame portion extending along the second direction between the first frame portion and the second frame portion and arranged facing each other across the coupling portion, wherein the first frame portion includes a fifth frame portion on the third frame portion side relative to the coupling portion and a sixth frame portion on the fourth frame portion side relative to the coupling portion, the second frame portion includes a seventh frame portion on the third frame portion side relative to the coupling portion and an eighth frame portion on the fourth frame portion side relative to the coupling portion, at least one of the third frame portion, the fifth frame portion, or the seventh frame portion has a first gap which reaches to a first space portion surrounded by the coupling portion, the third frame portion, the fifth frame portion, and the seventh frame portion from an outer edge, and at least one of the fourth frame portion, the sixth frame portion, or the eighth frame portion has a second gap which reaches to a second space portion surrounded by the coupling portion, the fourth frame portion, the sixth frame portion, or the eighth frame portion from an outer edge, wherein the die pad further includes:

a first extending portion extending from the third frame portion, the fifth frame portion, the seventh frame portion, or the coupling portion into the first space portion; and a second extending portion extending from the fourth frame portion, the sixth frame portion, the eighth frame portion, or the coupling portion into the second space portion, wherein the first extending portion has the first slit, the first magnetoelectric conversion unit is arranged facing the first surface at an end of the first extending portion, the second extending portion has the second slit, and the second magnetoelectric conversion unit is arranged facing the first surface at an end of the second extending portion.

(Item 30)

The magnetic sensor according to item 29, wherein the first extending portion extends from the third frame portion toward the coupling portion along the first direction and is spaced apart from the coupling portion, and the second extending portion extends from the fourth frame portion toward the coupling portion along the first direction and is spaced apart from the coupling portion.

(Item 31)

The magnetic sensor according to item 29, wherein the first extending portion extends from the fifth frame portion toward the seventh frame portion along the second direction and is spaced apart from the seventh frame portion, or alternatively, extends from the seventh frame portion toward the fifth frame portion along the second direction and is spaced apart from the fifth frame portion.

(Item 32)

The magnetic sensor according to item 29, wherein the first magnetoelectric conversion unit and the second magnetoelectric conversion unit are arranged facing each other across the coupling portion in the first direction in a plan view.

(Item 33)

The magnetic sensor according to item 28, comprising a signal processing IC, wherein the signal processing IC has the signal processing unit, and the first magnetoelectric conversion element and the second magnetoelectric conversion element are arranged on a surface on an opposite side of a surface facing the die pad of the signal processing IC.

(Item 34)

The magnetic sensor according to item 33, wherein the first magnetoelectric conversion element and the second magnetoelectric conversion element are Hall elements.

(Item 35)

The magnetic sensor according to item 33, further comprising an encapsulating portion which encapsulates the signal processing IC, the first magnetoelectric conversion element, and the second magnetoelectric conversion element with mold resin.

(Item 36)

A magnetic sensor comprising:

a die pad;

a first magnetoelectric conversion unit which detects a magnetic field and converts it to an electrical signal, the first magnetoelectric conversion unit being provided on a first face side of the die pad;

a second magnetoelectric conversion unit which detects a magnetic field and converts it to an electrical signal, the second magnetoelectric conversion unit being provided on the first face side of the die pad; and a signal processing unit which processes signals output from the first magnetoelectric conversion unit and the second magnetoelectric conversion unit, wherein the die pad includes:

a first frame portion extending along a first direction;

a second frame portion extending along the first direction and facing the first frame portion in a second direction which intersects with the first direction, and spaced apart from the first frame portion; and a third frame portion and a fourth frame portion extending along the second direction between the first frame portion and the second frame portion and spaced apart from each other in the first direction, and wherein any one of the first frame portion, the second frame portion, the third frame portion, and the fourth frame portion has a gap which reaches to a space surrounded by the first frame portion, the second frame portion, the third frame portion, and the fourth frame portion from an outer edge, and the first magnetoelectric conversion unit and the second magnetoelectric conversion unit are arranged in the space facing each other in the first direction.
(Item 37)
The magnetic sensor according to item 36, comprising a signal processing IC, wherein
the signal processing IC has the signal processing unit, and
the first magnetoelectric conversion unit and the second magnetoelectric conversion unit are arranged on a surface on an opposite side of a surface facing the die pad of the signal processing IC.
(Item 38)
The magnetic sensor according to item 37, comprising a first magnetoelectric conversion element and a second magnetoelectric conversion element, wherein
the first magnetoelectric conversion element has the first magnetoelectric conversion unit, and
the second magnetoelectric conversion element has the second magnetoelectric conversion unit.
(Item 39)
The magnetic sensor according to item 38, wherein the first magnetoelectric conversion element and the second magnetoelectric conversion element are Hall elements.
(Item 40)
The magnetic sensor according to item 38, further comprising an encapsulating portion which encapsulates the signal processing IC, the first magnetoelectric conversion element, and the second magnetoelectric conversion element with mold resin.
(Item 41)
The magnetic sensor according to any one of items 1 to 40, further comprising a first lead terminal and a second lead terminal facing each other across the die pad, wherein
the die pad is composed of lead frame together with the first lead terminal and the second lead terminal.

EXPLANATION OF REFERENCES 11, 12: lead terminal;
21, 22: magnetoelectric conversion element;
25: signal processing IC;
31, 32, 35: adhesive layer;
41, 42, 45: wire;
51: encapsulating portion;
60: die pad;
601: first frame portion;
602: second frame portion;
600: coupling portion;
603: third frame portion;
604: fourth frame portion;
605: fifth frame portion;
606: sixth frame portion;
607: seventh frame portion;
608: eighth frame portion;
609: ninth frame portion;
610: tenth frame portion;
611: eleventh frame portion;
612: twelfth frame portion;
621: first extending portion;
622: second extending portion;
623: third extending portion;
624: fourth extending portion;
71, 72: space portion;
76: first gap;
77: second gap;
78: first slit;
79: second slit;
100, 100A, 100B, 100C, 100D, 100E, 100F, 100G, 100H: magnetic sensor;
110: external input magnetic flux density;
120: eddy current;
130: counter magnetic flux density;
140: conductive flat plate;
151, 152: magnetoelectric conversion unit.

What is claimed is:

1. A magnetic sensor comprising:
a die pad; and
a first magnetoelectric conversion unit which detects a magnetic field and converts it to an electrical signal, a second magnetoelectric conversion unit which detects a magnetic field and converts it to an electrical signal, and a signal processing unit which processes signals output from the first magnetoelectric conversion unit and the second magnetoelectric conversion unit, which are provided on a first face side of the die pad;
wherein the die pad includes:
a first frame portion extending along a first direction;
a second frame portion extending along the first direction and facing the first frame portion in a second direction which intersects with the first direction, and spaced apart from the first frame portion;
a coupling portion extending along the second direction and coupling the first frame portion and the second frame portion; and
a third frame portion and a fourth frame portion extending along the second direction between the first frame portion and the second frame portion and arranged facing each other across the coupling portion, and
wherein the first magnetoelectric conversion unit and the second magnetoelectric conversion unit are arranged facing each other in the first direction across the coupling portion between the third frame portion and the fourth frame portion in a plan view,
the first frame portion includes a fifth frame portion on the third frame portion side relative to the coupling portion and a sixth frame portion on the fourth frame portion side relative to the coupling portion,
the second frame portion includes a seventh frame portion on the third frame portion side relative to the coupling portion and an eighth frame portion on the fourth frame portion side relative to the coupling portion,
at least one of the third frame portion, the fifth frame portion, or the seventh frame portion has a first gap which reaches to a first space portion surrounded by the coupling portion, the third frame portion, the fifth frame portion, and the seventh frame portion from an outer edge, and
at least one of the fourth frame portion, the sixth frame portion, or the eighth frame portion has a second gap which reaches to a second space portion surrounded by the coupling portion, the fourth frame portion, the sixth frame portion, and the eighth frame portion from an outer edge.

2. The magnetic sensor according to claim 1, wherein the signal processing unit is supported by the first frame portion, the second frame portion, and the coupling portion.

3. The magnetic sensor according to claim 1, wherein
the third frame portion has the first gap extending in the first direction, and
the fourth frame portion has the second gap extending in the first direction.

4. The magnetic sensor according to claim 1, wherein
one of the fifth frame portion or the seventh frame portion has the first gap extending in the second direction, and
one of the sixth frame portion or the eighth frame portion has the second gap extending in the second direction.

5. The magnetic sensor according to claim 1, wherein
the die pad further includes a first extending portion extending from the third frame portion, the fifth frame portion, the seventh frame portion, or the coupling portion into the first space portion, and
the first magnetoelectric conversion unit is arranged on the first face side at an end of the first extending portion.

6. The magnetic sensor according to claim 5, wherein the first extending portion extends from the third frame portion toward the coupling portion along the first direction, and is spaced apart from the coupling portion.

7. The magnetic sensor according to claim 5, wherein the first extending portion extends from the fifth frame portion toward the seventh frame portion along the second direction and is spaced apart from the seventh frame portion, or alternatively, extends from the seventh frame portion toward the fifth frame portion along the second direction and is spaced apart from the fifth frame portion.

8. The magnetic sensor according to claim 5, wherein the end of the first extending portion has a first slit which at least extends to a position facing the first magnetoelectric conversion unit.

9. The magnetic sensor according to claim 6, wherein
the end of the first extending portion has a first slit which at least extends to a position facing the first magnetoelectric conversion unit, and
the first slit extends along the first direction.

10. The magnetic sensor according to claim 7, wherein
the end of the first extending portion has a first slit which at least extends to a position facing the first magnetoelectric conversion unit, and
the first slit extends along the second direction.

11. The magnetic sensor according to claim 8, comprising first magnetoelectric conversion element, wherein
the first magnetoelectric conversion element has the first magnetoelectric conversion unit, and
at least part of a surrounding portion of the first magnetoelectric conversion unit of the first magnetoelectric conversion element is supported by an outer portion of the first slit of the die pad.

12. The magnetic sensor according to claim 11, wherein
the die pad further includes a second extending portion extending from the fourth frame portion, the sixth frame portion, the eighth frame portion, or the coupling portion into the second space portion, and
the second magnetoelectric conversion unit is arranged on the first face side at an end of the second extending portion.

13. The magnetic sensor according to claim 12, wherein the second extending portion extends from the fourth frame portion toward the coupling portion along the first direction, and is spaced apart from the coupling portion.

14. The magnetic sensor according to claim 12, wherein the second extending portion extends from the sixth frame portion toward the eighth frame portion along the second direction and is spaced apart from the eighth frame portion, or alternatively, extends from the eighth frame portion toward the sixth frame portion along the second direction and is spaced apart from the sixth frame portion.

15. The magnetic sensor according to claim 12, wherein the end of the second extending portion has a second slit which at least extends to a position facing the second magnetoelectric conversion unit.

16. The magnetic sensor according to claim 13, wherein
the end of the second extending portion has a second slit which at least extends to a position facing the second magnetoelectric conversion unit, and
the second slit extends along the first direction.

17. The magnetic sensor according to claim 14, wherein
the end of the second extending portion has a second slit which at least extends to a position facing the second magnetoelectric conversion unit, and
the second slit extends along the second direction.

18. The magnetic sensor according to claim 15, comprising a second magnetoelectric conversion element, wherein
the second magnetoelectric conversion element has the second magnetoelectric conversion unit, and
a surrounding portion of the second magnetoelectric conversion unit of the second magnetoelectric conversion element is supported by an outer portion of the second slit of the die pad.

19. The magnetic sensor according to claim 18, comprising a signal processing IC, wherein
the signal processing IC has the signal processing unit, and
the first magnetoelectric conversion element and the second magnetoelectric conversion element are arranged on a surface on an opposite side of a surface facing the die pad of the signal processing IC.

20. The magnetic sensor according to claim 19, wherein the first magnetoelectric conversion element and the second magnetoelectric conversion element are Hall elements.

21. The magnetic sensor according to claim 19, further comprising an encapsulating portion which encapsulates the signal processing IC, the first magnetoelectric conversion element, and the second magnetoelectric conversion element with mold resin.

22. The magnetic sensor according to claim 15, wherein
the die pad further includes a third extending portion which extends from the third frame portion, the fifth frame portion, the seventh frame portion, or the coupling portion into the first space portion so as not to overlap with the first extending portion in a plan view.

23. The magnetic sensor according to claim 15, wherein
the die pad further includes a third extending portion extending from the third frame portion toward the coupling portion along the first direction, and further extending toward the seventh frame portion along the second direction to an area between the first extending portion and the coupling portion, and
the third extending portion is spaced apart from the fifth frame portion, the seventh frame portion, the first extending portion, and the coupling portion.

24. The magnetic sensor according to claim 15, wherein
the die pad further includes a third extending portion extending from the fifth frame portion or the seventh frame portion toward the seventh frame portion or the fifth frame portion along the second direction, and further extending toward the third frame portion along the first direction, and
the third extending portion is spaced apart from the seventh frame portion or the fifth frame portion, the first extending portion, and the coupling portion.

25. The magnetic sensor according to claim 22, wherein
the die pad further includes a fourth extending portion extending from the fourth frame portion, the sixth frame portion, the eighth frame portion, or the coupling portion into the second space portion so as not to overlap with the second extending portion in a plan view.

26. The magnetic sensor according to claim 23, wherein
the die pad further includes a fourth extending portion extending from the fourth frame portion toward the coupling portion along the first direction, and further extending toward the eighth frame portion along the second direction to an area between the second extending portion and the coupling portion, and
the fourth extending portion is spaced apart from the sixth frame portion, the eighth frame portion, the second extending portion, and the coupling portion.

27. The magnetic sensor according to claim 24, wherein
the die pad further includes a fourth extending portion extending from the sixth frame portion or the eighth frame portion toward the eighth frame portion or the sixth frame portion along the second direction, and further extending toward the fourth frame portion along the first direction, and
the fourth extending portion is spaced apart from the eighth frame portion or the sixth frame portion, the second extending portion, and the coupling portion.

28. The magnetic sensor according to claim 1, further comprising a first lead terminal and a second lead terminal facing each other across the die pad, wherein
the die pad is composed of lead frame together with the first lead terminal and the second lead terminal.

\* \* \* \* \*